United States Patent
Sato

(10) Patent No.: US 8,494,442 B2
(45) Date of Patent: Jul. 23, 2013

(54) COMMUNICATION APPARATUS, RELAY APPARATUS, WIRELESS COMMUNICATION SYSTEM, CONTROL METHOD OF COMMUNICATION APPARATUS, CONTROL METHOD OF RELAY APPARATUS, AND STORAGE MEDIUM

(75) Inventor: Ryosuke Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 13/166,954

(22) Filed: Jun. 23, 2011

(65) Prior Publication Data

US 2012/0028571 A1 Feb. 2, 2012

(30) Foreign Application Priority Data

Jul. 29, 2010 (JP) ................................ 2010-171176

(51) Int. Cl.
*H04B 7/15* (2006.01)
(52) U.S. Cl.
USPC ............................ 455/11.1; 455/13.1; 455/16
(58) Field of Classification Search
USPC ............... 455/3.02, 427, 428, 430, 431, 7–9, 455/11.1, 12.1, 13.1, 13.2, 14–17; 340/425.1; 370/226, 293, 246, 274, 279, 315, 316, 492, 370/501
See application file for complete search history.

(56) References Cited

U.S. PATENT DOCUMENTS

| | | | |
|---|---|---|---|
| 7,103,604 B2 * | 9/2006 | Maeda et al. .......................... 1/1 |
| 7,111,164 B2 * | 9/2006 | Kinoshita ...................... 713/166 |
| 7,225,261 B2 * | 5/2007 | Nishiguchi et al. ............ 709/227 |
| 8,045,530 B2 * | 10/2011 | Haverinen et al. ............. 370/338 |
| 8,122,497 B2 * | 2/2012 | Neely .............................. 726/18 |
| 2005/0160185 A1 * | 7/2005 | Matsuura et al. ................. 710/1 |
| 2005/0210395 A1 * | 9/2005 | Wakita et al. .................. 715/753 |
| 2007/0101404 A1 * | 5/2007 | Higashikado et al. ............. 726/3 |
| 2007/0240330 A1 * | 10/2007 | Beasley ............................ 36/7.2 |
| 2008/0005359 A1 * | 1/2008 | Khosravi et al. .............. 709/250 |
| 2008/0034092 A1 * | 2/2008 | Kikuchi et al. ................ 709/225 |
| 2008/0045220 A1 * | 2/2008 | Ishii et al. ...................... 455/438 |
| 2009/0100355 A1 * | 4/2009 | Takemura et al. ............. 715/757 |
| 2009/0296724 A1 * | 12/2009 | Matsunaga .................... 370/401 |
| 2010/0330957 A1 * | 12/2010 | Harada et al. ................. 455/406 |
| 2013/0067356 A1 * | 3/2013 | Wakita et al. ................. 715/753 |

FOREIGN PATENT DOCUMENTS

JP 2010-026562 A 2/2010

* cited by examiner

*Primary Examiner* — Dominic E Rego
(74) *Attorney, Agent, or Firm* — Fitzpatrick, Cella, Harper & Scinto

(57) ABSTRACT

A communication apparatus, which is connected to a relay apparatus, and transmits data to a server apparatus connected via the relay apparatus, includes a determination unit which determines whether the communication apparatus or the relay apparatus holds an access function required to execute access processing to the server apparatus, a decision unit which decides, according to the determination result, a transmission method required to transmit the data by controlling an access processing unit of the apparatus that holds the access function to execute the access processing, and a transmission unit which transmits the data by the decided transmission method.

25 Claims, 19 Drawing Sheets

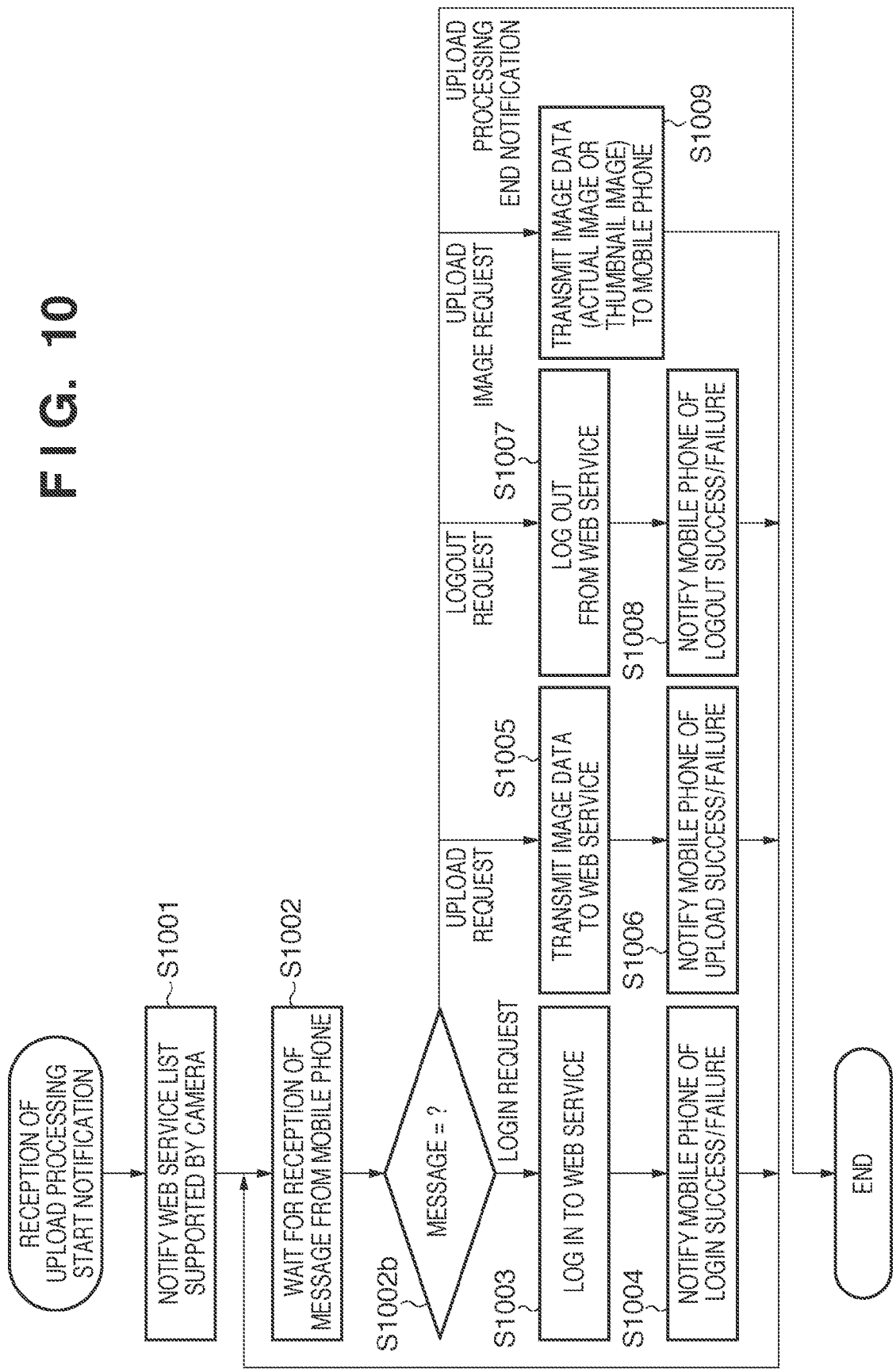

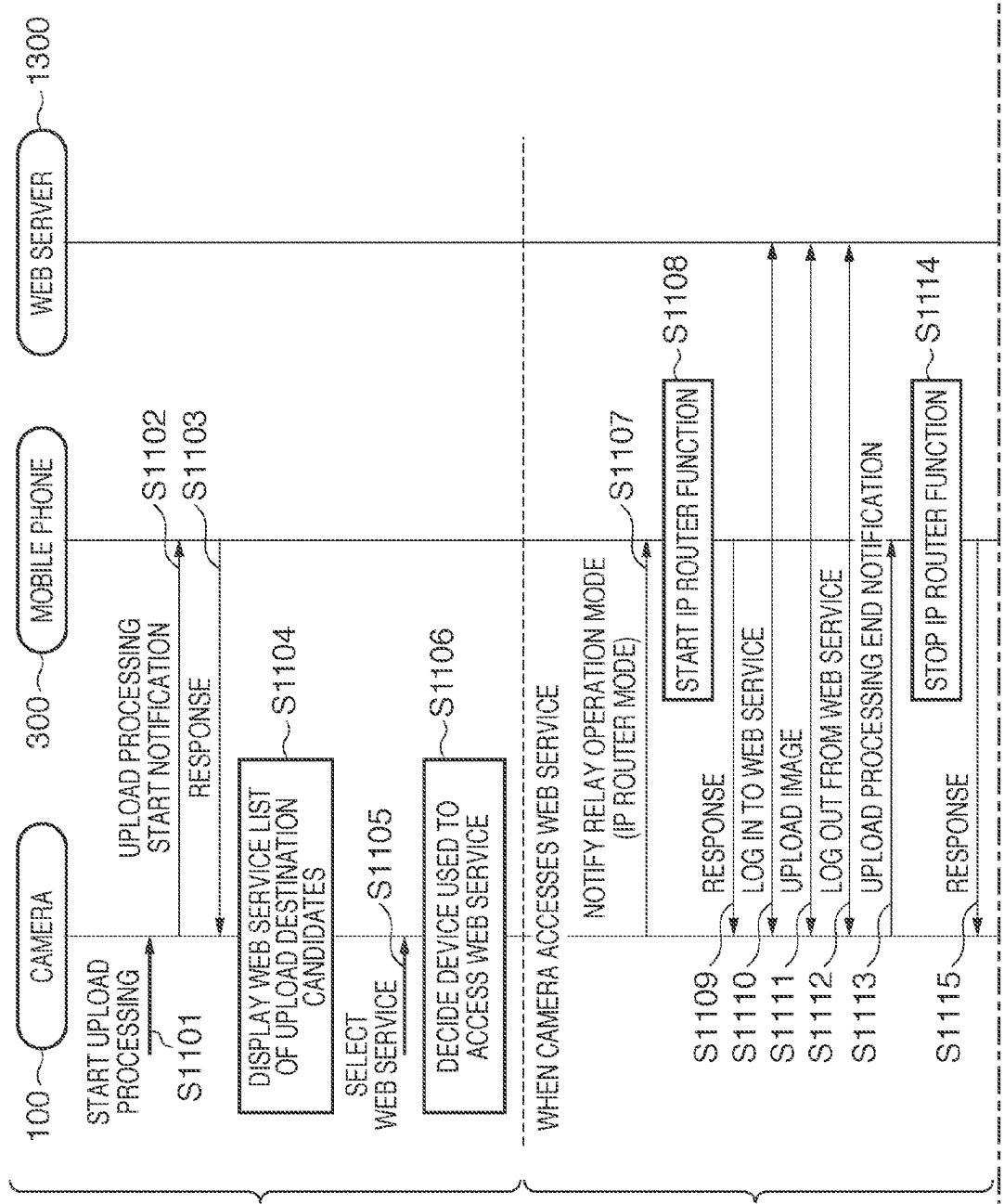

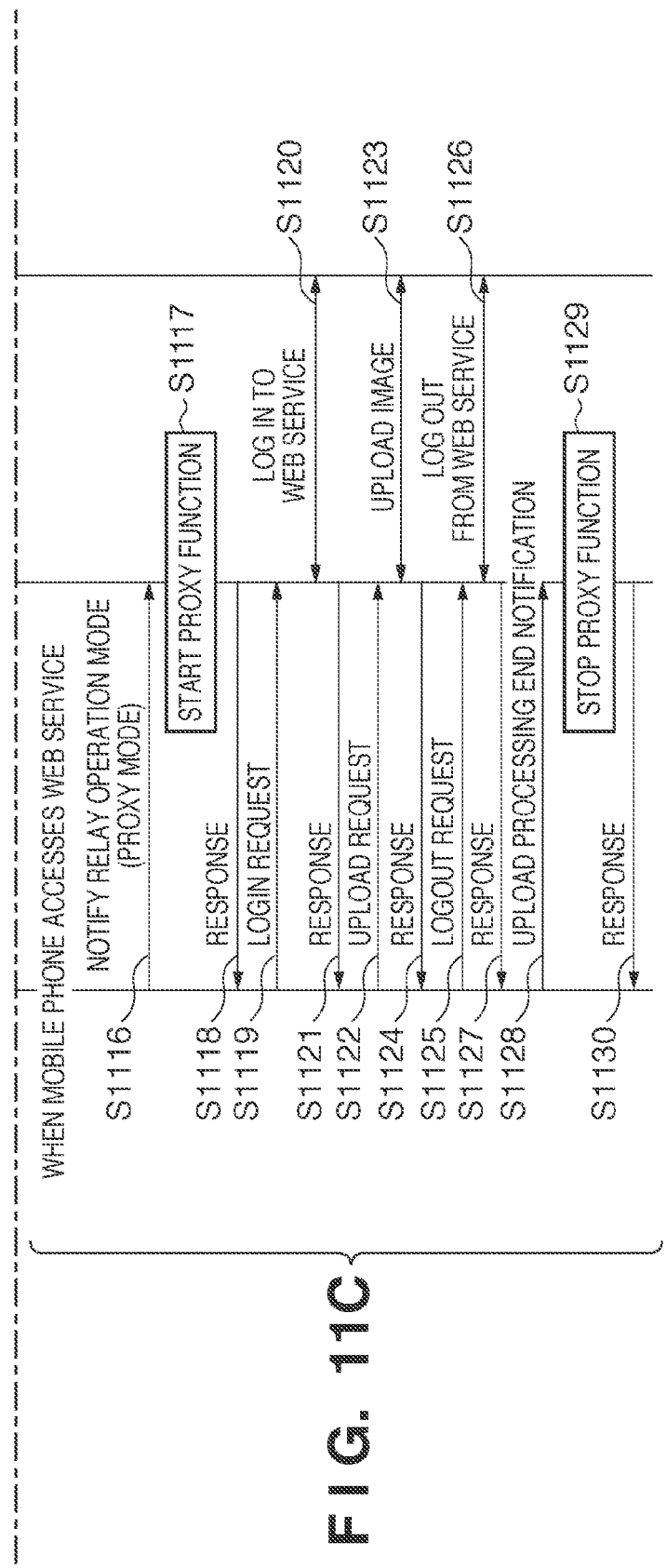

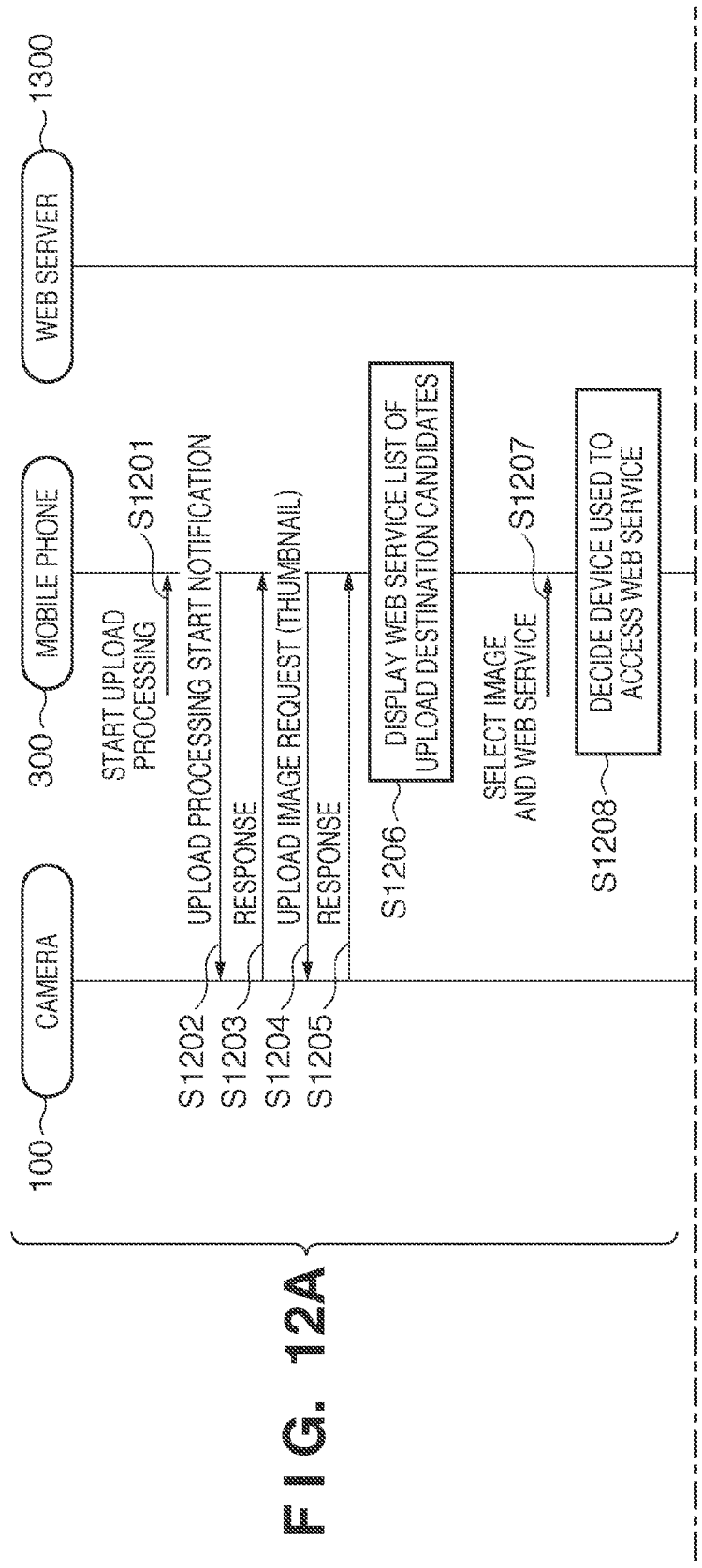

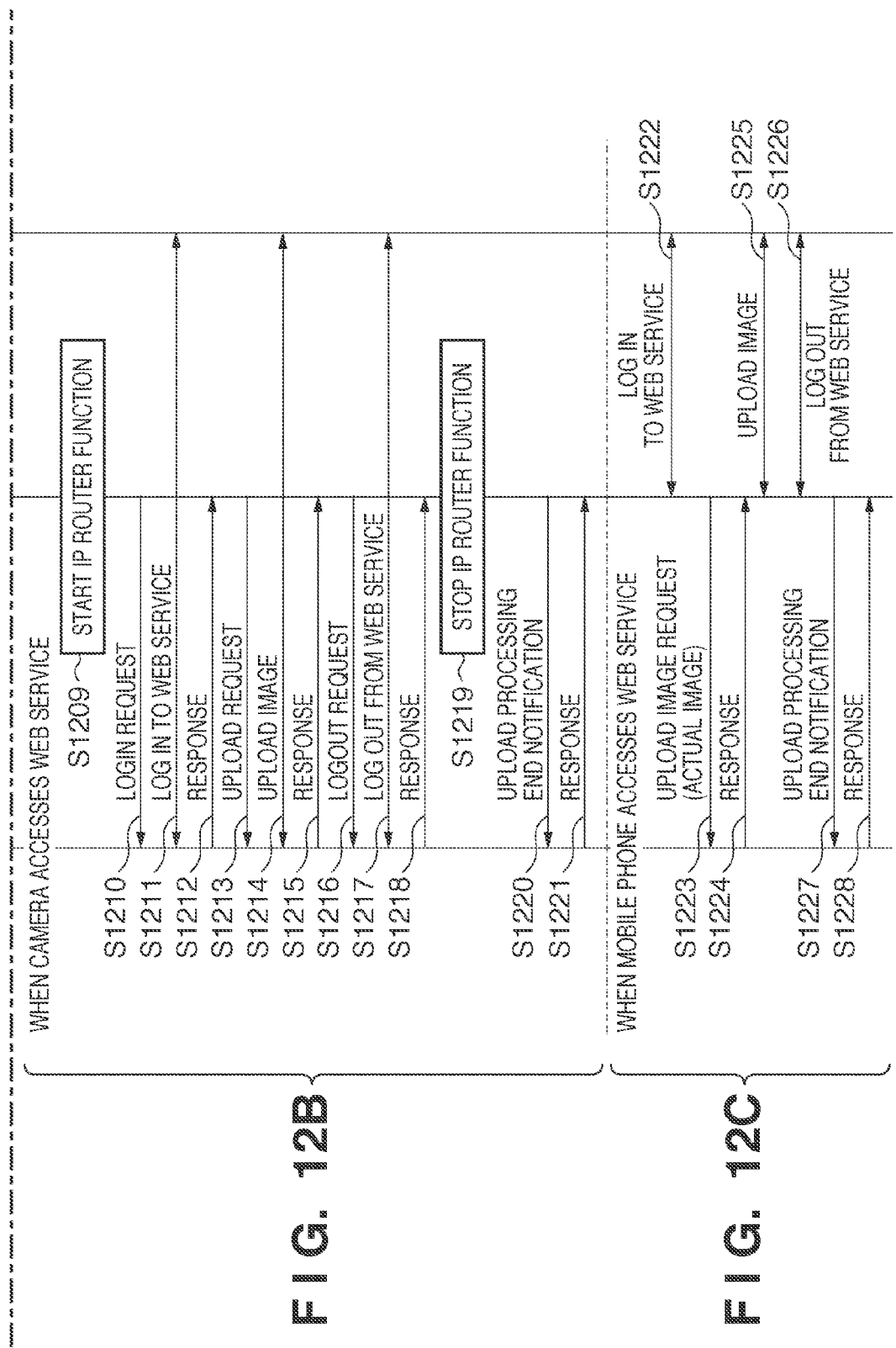

| No. | WEB SERVICE NAME | COMPATIBLE SERVICE VERSION |
|---|---|---|
| 1 | AAA PHOTO SERVICE | 1.00 |
| 2 | CCC PHOTO SERVICE | 2.00 |

| No. | WEB SERVICE NAME | COMPATIBLE SERVICE VERSION |
|---|---|---|
| 1 | BBB PHOTO SERVICE | 1.00 |
| 2 | CCC PHOTO SERVICE | 2.05 |

COMMUNICATION APPARATUS, RELAY APPARATUS, WIRELESS COMMUNICATION SYSTEM, CONTROL METHOD OF COMMUNICATION APPARATUS, CONTROL METHOD OF RELAY APPARATUS, AND STORAGE MEDIUM

BACKGROUND OF THE INVENTION

1. Field of the Invention

The present invention relates to a communication apparatus, a relay apparatus, a wireless communication system, a control method of the communication apparatus, a control method of the relay apparatus, and a storage medium.

2. Description of the Related Art

A mobile phone which can upload an image file to a Web service (image sharing service) on the Internet is available. Also, a camera which can upload a captured image to a similar service is available. In recent years, a camera and mobile phone, which have near distance wireless interfaces for, for example, a wireless LAN, are available. When such a camera and mobile phone are connected via a wireless communication, since the mobile phone serves as a relay apparatus between the camera and Web service, a system which uploads an image in the camera to the Web service can be built.

On the other hand, in order to use the aforementioned Web service, a device has to communicate with the Web service using a message which describes operations defined in a profile published by the Web service. For example, when there are a plurality of Web services, a device which uses these Web services has to support message communications that are respectively compatible with a plurality of Web servers. The aforementioned mobile phone and camera normally incorporate message communications that are compatible with a plurality of Web services.

According to Japanese Patent Laid-Open No. 2010-26562, a relay server which manages means required to access Web services together, access the Web services in response to requests from terminals has been proposed. With this technique, only the relay server supports message communications respectively compatible with Web servers, and communication terminals which establish connections with the relay server need not incorporate the message communications with the Web services. By replacing the above technique by the aforementioned system which connects the camera and mobile phone, if the mobile phone incorporates a message communication compatible with a Web service, the camera can upload an image to the Web service if it does not incorporate any message communication compatible with the Web service.

SUMMARY OF THE INVENTION

However, Japanese Patent Laid-Open No. 2010-26562 does not consider any Web services supported by communication terminals. In the aforementioned system which connects the camera and mobile phone, each of the camera and mobile phone can individually establish a connection to the Web service to upload an image. Since the camera and mobile phone operate based on different software programs, types of Web services supported by them may often be different. In such case, the user has to execute upload processing by operating the device which is compatible with a Web service to which an image is to be uploaded in consideration of the Web services supported by these devices.

For example, a case will be assumed wherein the camera is compatible with two Web services A and B, and the mobile phone is compatible with Web services A and C. In this case, when the user wants to upload an image to Web service B, he or she has to operate the camera. On the other hand, when the user wants to upload an image to Web service C, he or she has to operate the mobile phone.

It is an object of the present invention to provide a technique which allows the user to transmit an image without considering an apparatus which supports an access function to a Web service in a system which transmits data to the Web service via a relay apparatus. That is, the present invention provides an apparatus and wireless communication system, which allow the user to upload an image by operating one of a communication apparatus and relay apparatus.

According to one aspect of the present invention, there is provided a communication apparatus, which is connected to a relay apparatus, and transmits data to a server apparatus connected via the relay apparatus, the apparatus comprising: a determination unit adapted to determine whether the communication apparatus or the relay apparatus holds an access function required to execute access processing to the server apparatus; a decision unit adapted to decide, according to a determination result of the determination unit, a transmission method required to transmit the data by controlling an access processing unit of the apparatus that holds the access function to execute the access processing; and a transmission unit adapted to transmit the data by the transmission method decided by the decision unit.

According to another aspect of the present invention, there is provided a relay apparatus, which is connected to a communication apparatus and a server apparatus, and relays transmission of data from the communication apparatus to the server apparatus, the apparatus comprising: a determination unit adapted to determine whether the communication apparatus or the relay apparatus holds an access function required to execute access processing to the server apparatus; a decision unit adapted to decide, according to a determination result of the determination unit, a transmission method required to transmit the data by controlling an access processing unit of the apparatus that holds the access function to execute the access processing; and a transmission unit adapted to transmit the data by the transmission method decided by the decision unit.

According to still another aspect of the present invention, there is provided a wireless communication system in which a communication apparatus is connected to a relay apparatus, and transmits data to a server apparatus connected via the relay apparatus, the communication apparatus and the relay apparatus comprising: a determination unit adapted to determine whether the communication apparatus or the relay apparatus holds an access function required to execute access processing to the server apparatus; a decision unit adapted to decide, according to a determination result of the determination unit, a transmission method required to transmit the data by controlling an access processing unit of the apparatus that holds the access function to execute the access processing; and a transmission unit adapted to transmit the data by the transmission method decided by the decision unit.

According to the present invention, the user can transmit an image without considering an apparatus which supports an access function to a Web service in a system which transmits an image in a communication apparatus to the Web service via a relay apparatus.

Further features of the present invention will become apparent from the following description of exemplary embodiments (with reference to the attached drawings).

BRIEF DESCRIPTION OF THE DRAWINGS

FIG. 10 is a flowchart for explaining the operation sequence of the communication device according to the second embodiment;

FIGS. 11A to 11C are charts for explaining an example of a communication sequence among devices, that is, among the communication device, the relay device, and a server apparatus according to the first embodiment;

FIGS. 12A to 12C are charts for explaining an example of a communication sequence among devices, that is, among the communication device, the relay device, and a server apparatus according to the second embodiment;

DESCRIPTION OF THE EMBODIMENTS

First Embodiment (Hardware Arrangement of Communication Device)

Figure 1:
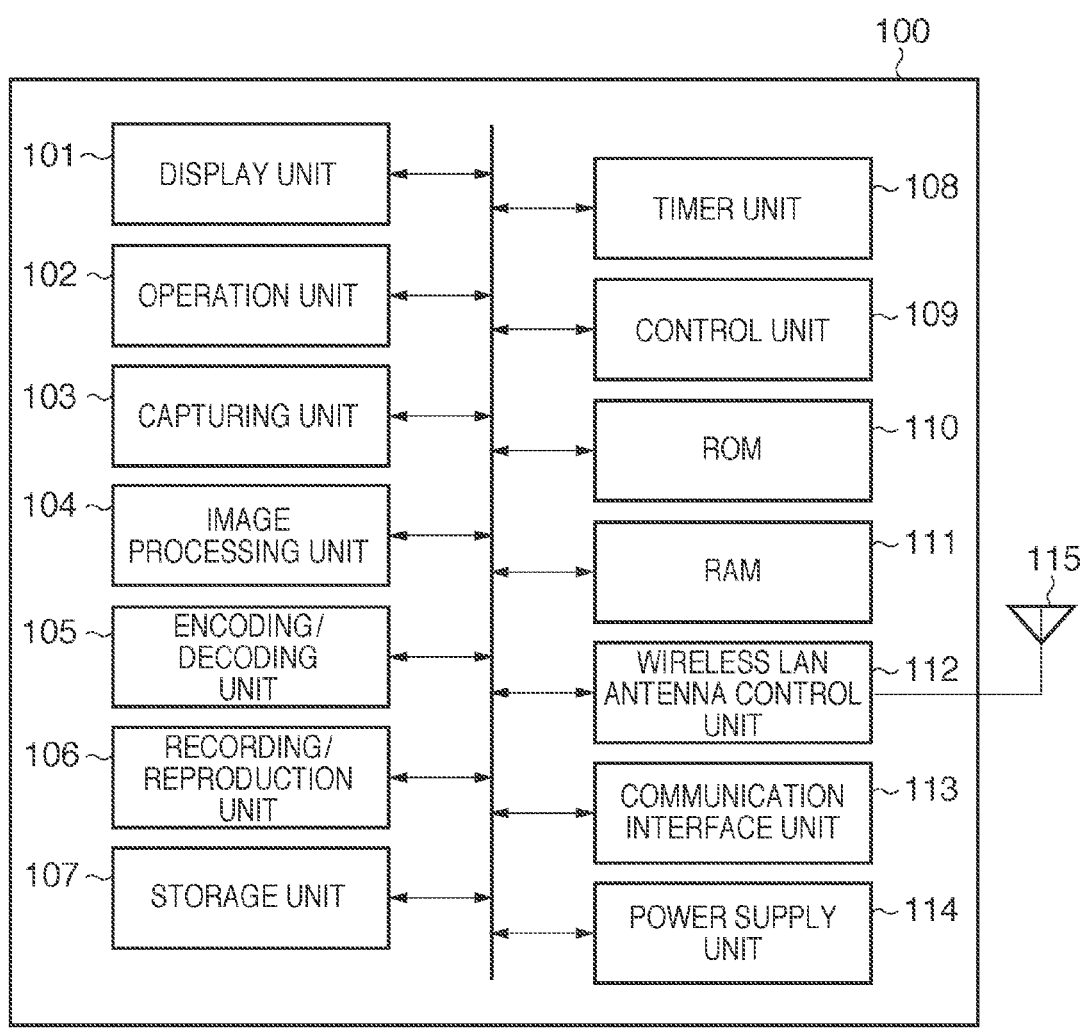
FIG. 1 is a block diagram showing an example of the hardware arrangement of a communication device according to the first and second embodiments.

A communication apparatus (communication device) according to this embodiment will be described in detail below with reference to the drawings. The hardware arrangement of a camera 100 as a communication device according to the embodiment of the present invention will be described below with reference to FIG. 1. A display unit 101 and operation unit 102 serve as a user interface required to, for example, display and execute an application. Whether or not the communication device is operated is determined by checking the presence/absence of an operation input from the operation unit 102. A capturing unit 103 captures an optical image of an object. An image processing unit 104 converts a captured image output from the capturing unit 103 into image data of a predetermined format, and appends a digital watermark to the image data. An encoding/decoding unit 105 applies predetermined high-efficiency encoding (for example, variable-length encoding after DCT transformation and quantization) to the image data output from the image processing unit 104. The encoding/decoding unit 105 expands and decodes compressed image data reproduced from a recording/reproduction unit 106, and supplies that image data to the image processing unit 104. The recording/reproduction unit 106 records/reproduces image data which has undergone compression encoding on/from a recording medium (not shown). The communication device of this embodiment adopts, for example, a JPEG (Joint Photographic Experts Group) method as a technique for compressing and encoding image data. A storage unit 107 stores and manages various data such as wireless communication network information, data transmission/reception information, communication device information, and available service information. A timer unit 108 measures a time. A control unit 109 controls the camera 100. A ROM 110 stores control commands, that is, programs. Reference numeral 111 denotes a RAM. An antenna 115 is used to make a wireless LAN communication. A wireless LAN antenna control unit 112 controls the antenna 115. A communication interface unit (to be referred to as a communication IF hereinafter) 113 executes communication processing including network search, building, connection, and management processes. A power supply unit 114 supplies an electric power to the communication device (communication apparatus).

(Functional Configuration of Communication Device)

Figure 2:
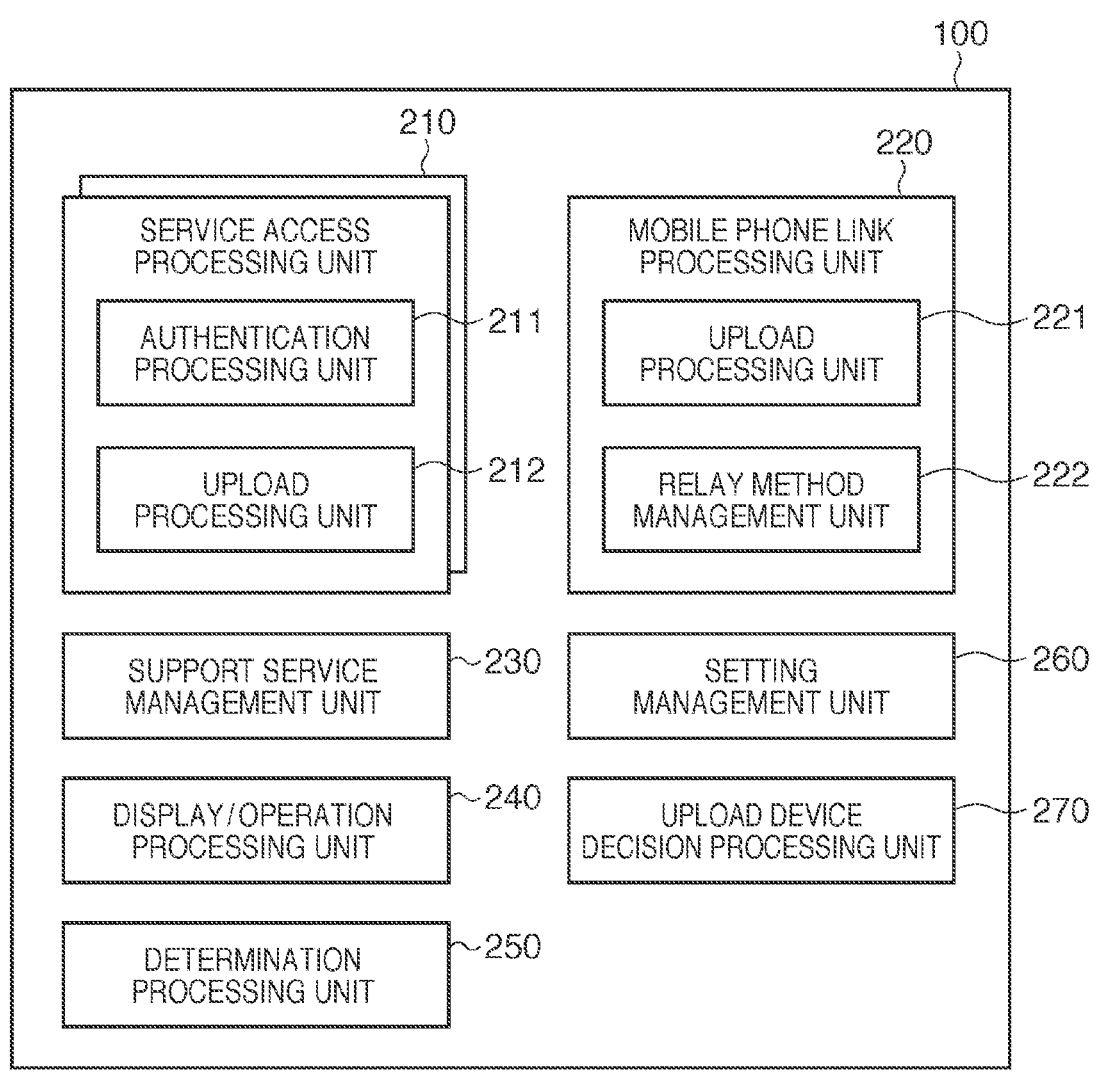
FIG. 2 is a block diagram showing an example of the functional configuration of the communication device according to the first and second embodiments.

The functional configuration of the communication device will be described below with reference to FIG. 2. In this embodiment, functional blocks of the communication device are stored in the ROM 110 as programs, which are executed by the control unit 109. Note that some or all of the functional blocks of the communication device may be implemented by hardware.

A service access processing unit 210 is a processing unit which incorporates communication protocols required to access a Web service. The service access processing unit 210 exchanges a message, which describes operations defined in a profile published in a WSDL (Web Services Description Language) by a Web service apparatus, with the Web service apparatus. The service access processing unit 210 includes an authentication processing unit 211 and upload processing unit 212.

The authentication processing unit 211 executes authentication processing (login and logout processes) for a Web service using authentication information managed by itself. The upload processing unit 212 uploads data to the Web service. The service access processing unit 210 is a functional block which is prepared for each compatible Web service and each version of the Web service.

Note that the Web service of this embodiment assumes an image storage service which saves and manages image files and, hence, data to be uploaded is image data. However, the gist of the present invention is not limited to this.

A mobile phone link processing unit 220 is a processing unit which exchanges messages with a mobile phone to exchange data and to issue control requests. The mobile phone link processing unit 220 includes an upload processing unit 221 and relay method management unit 222.

The upload processing unit 221 requests the mobile phone to upload image data to the Web service. Also, the upload processing unit 221 requests the service access processing unit 210 to upload an image to the Web service in response to a request from the mobile phone. The relay method management unit 222 monitors whether data relay processing to be executed by the mobile phone is an IP router mode or Proxy mode, and notifies the mobile phone of one of these modes to be executed.

(IP Router Mode and Proxy Mode)

Figures 13A, 13B, 13C:
FIG. 13A is a block diagram showing an example of the system arrangement according to the first and second embodiments of the present invention.
FIG. 13B is a table showing an example of information of Web services held by the communication device.
FIG. 13C is a table showing an example of information of Web services held by the relay device.
Figure 14A:
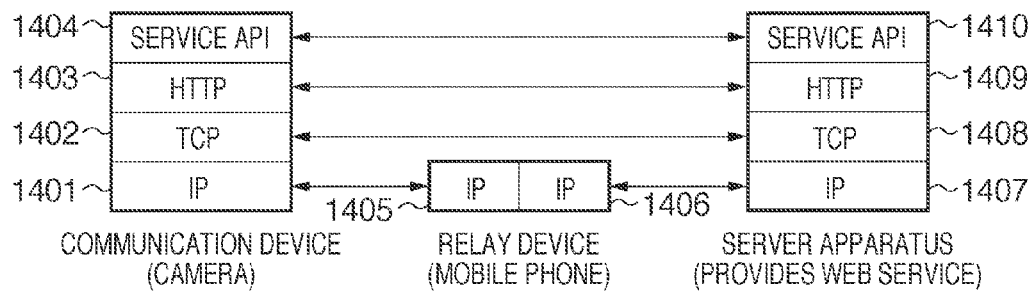
FIGS. 14A and 14B are charts showing examples of communication protocols in an IP router mode.

The IP router mode and Proxy mode will be described in detail below. FIG. 14A is a chart showing an example of communication protocols in the IP router mode. The communication protocols in the camera 100 (FIG. 13A) as a communication device and a Web server 1300 (FIG. 13A) will be described first. Internet protocols 1401 and 1407 handle, for example, IP packets. Transport protocols 1402 and 1408 handle, for example, TCP and UDP packets. Application protocols 1403 and 1409 handle, for example, HTTP packets. Application interface protocols 1404 and 1410 represent APIs required to access a Web service provided by the Web server 1300.

The communication protocols in a mobile phone 300 (FIG. 13A) as a relay device will be described below. In the mobile phone 300, processing protocols 1405 and 1406 implement IP address filtering and address conversion of IP packets. Then, the processing protocols 1405 and 1406 replace the Internet protocol 1401 of the camera 100 by an address which matches the Internet protocol 1407 of the Web server 1300. The remaining transport protocols, application protocols, and application interface protocols implement direct communication protocols between the camera 100 and Web server 1300 without any conversion or analysis of content data.

Figure 14B:
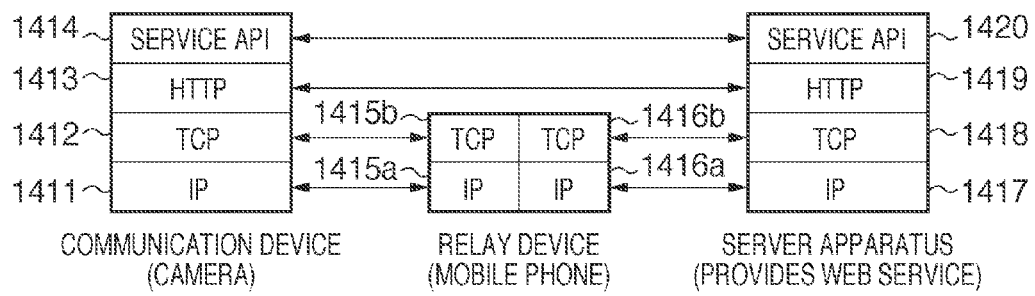

Also, FIG. 14B is a chart showing an example of the communication protocols in the IP router mode according to this embodiment. Since the respective protocols of the camera 100 as a communication device and Web server 1300 are the same as those in FIG. 14A, a description thereof will not be repeated. In the mobile phone 300, a mode generally called a circuit level gateway operates. In this case, in an Internet protocol 1415a and transport protocol 1415b, an IP address of the camera 100 as a client is used as a source IP address, and that of the Web server 1300 is used as a destination IP address. Also, in an Internet protocol 1416a and transport protocol 1416b, a circuit level gateway IP address of the mobile phone 300 is used as a source IP address, and an IP address of the Web server 1300 is used as a destination IP address. In this manner, the application protocols and application interface protocols implement direct communication protocols between the camera 100 and Web server 1300 without any conversion or analysis of content data.

Figure 14C:
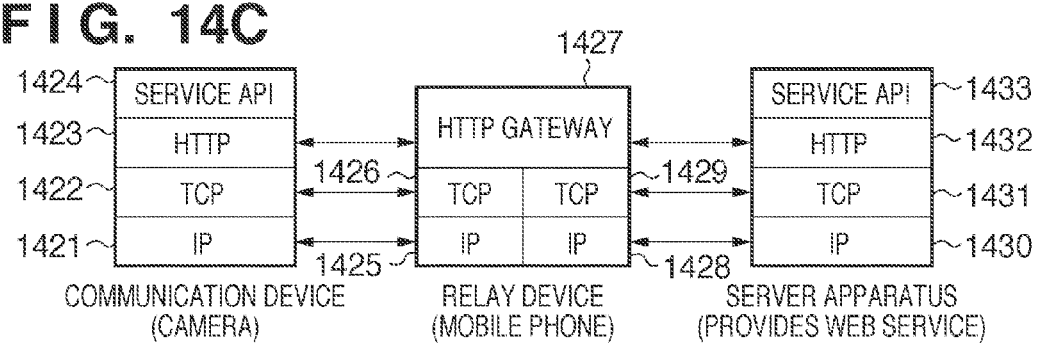
FIGS. 14C and 14D are charts showing examples of communication protocols in a Proxy mode.

FIG. 14C is a chart showing an example of communication protocols in the Proxy mode according to this embodiment. A description of Internet protocols 1421, 1425, 1428, and 1430, and transport protocols 1422, 1426, 1429, and 1431, which are the same as those in FIGS. 14A and 14B, will not be given. In the camera 100 and Web server 1300, application protocols 1423 and 1432 handle, for example, HTTP packets. In this case, the application protocols 1423 and 1432 communicate with an HTTP gateway 1427 of the mobile phone 300.

The HTTP gateway 1427 receives packets transferred via the application protocol 1423 designated by a service-1 API 1424 as an application interface protocol of the camera 100, and analyzes content data. Next, the HTTP gateway 1427 converts the data into packets which are controllable by a service-2 API 1433 as an application interface protocol of the Web server 1300. Subsequently, the packets are transferred to the Web server 1300 via the application procedure 1432. In this case, the HTTP gateway 1427 executes conversion processing of a request from the camera 100, and issues a request to the Web server 1300. Then, the HTTP gateway 1427 receives a response returned from the service-2 API 1433 of the Web server 1300, and returns it to the camera 100 after conversion processing. In this way, since the HTTP gateway 1427 as an application unit of the mobile phone 300 executes data analysis and conversion, the camera 100 and Web server 1300 can exchange communication data.

Figure 14D:
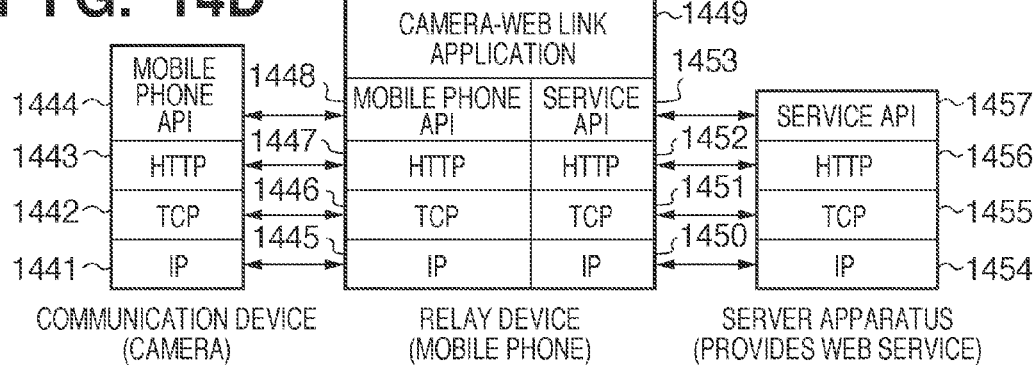

Also, FIG. 14D is a chart showing an example of communication protocols in the Proxy mode according to this embodiment. In this case, differences from FIGS. 14A, 14B, and 14C will be described below. Requests and responses are executed each other between a mobile phone API 1444 of the camera 100 and a mobile phone API 1448 of the mobile phone 300. On the other hand, requests and responses are executed each other between a service API 1457 of the Web server 1300 and a service API 1453 of the mobile phone 300. In this case, the mobile phone APIs and service APIs may operate independently. That is, even when a transmission request of captured image data from the camera 100 is generated in a camera-Web link application 1449, the mobile phone 300 can process the request from the camera in a state in which the mobile phone 300 itself is ready to transmit data to the Web server 1300. For example, the camera 100 and mobile phone 300 can make data communications via the mobile phone API 1444 in a wireless connection state, but the mobile phone 300 cannot often communicate with the Web server 1300 when a wireless communication is out-of-service. In such case, the mobile phone 300 can interrupt an access to the Web server 1300, and can execute data communications with the Web server 1300 via the service APIs when it returns within a service zone.

In this case, the IP router mode and Proxy mode have been exemplified. When the camera 100 as a client accesses the Web server 1300, which provides a Web service, by other means, a connection mode in which the client directly establishes a connection to the server apparatus, may be classified into the IP router mode. On the other hand, when the mobile phone 300 as the relay device accesses the Web server 1300 in place of the client, such mode may be classified into the Proxy mode.

Referring back to FIG. 2, a support service management unit 230 manages types of Web services incorporated in the camera 100 and their compatible versions. A display/operation processing unit 240 incorporates a function of displaying, for example, images to be uploaded and Web service names as upload destinations to the user, and prompting the user to select them. A determination processing unit 250 determines whether a device which supports access protocols for the Web service selected by the display/operation processing unit 240 is the camera or mobile phone. A setting management unit 260 is a functional block which manages various settings associated with the operations of the camera 100.

An upload device decision processing unit 270 decides upload protocols of an image to the Web service based on the determination result by the determination processing unit 250 and the setting information managed by the setting management unit 260. Then, the upload device decision processing unit 270 notifies the service access processing unit 210 and mobile phone link processing unit 220 of the decision result. The upload device decision processing unit 270 determines whether a device which directly accesses the Web service is the camera or mobile phone. Then, the upload device decision processing unit 270 notifies the mobile phone link processing unit 220 of the IP router mode as an operation mode of the mobile phone when the camera accesses the Web service or of the Proxy mode when the mobile phone accesses the Web service. The upload device decision processing unit 270 notifies so that the service access processing unit 210 executes upload processing when the camera accesses the Web service.

Also, the upload device decision processing unit 270 notifies so that the mobile phone link processing unit 220 executes upload processing when the mobile phone accesses the Web service.

(Hardware Arrangement of Relay Device)

Figure 3:
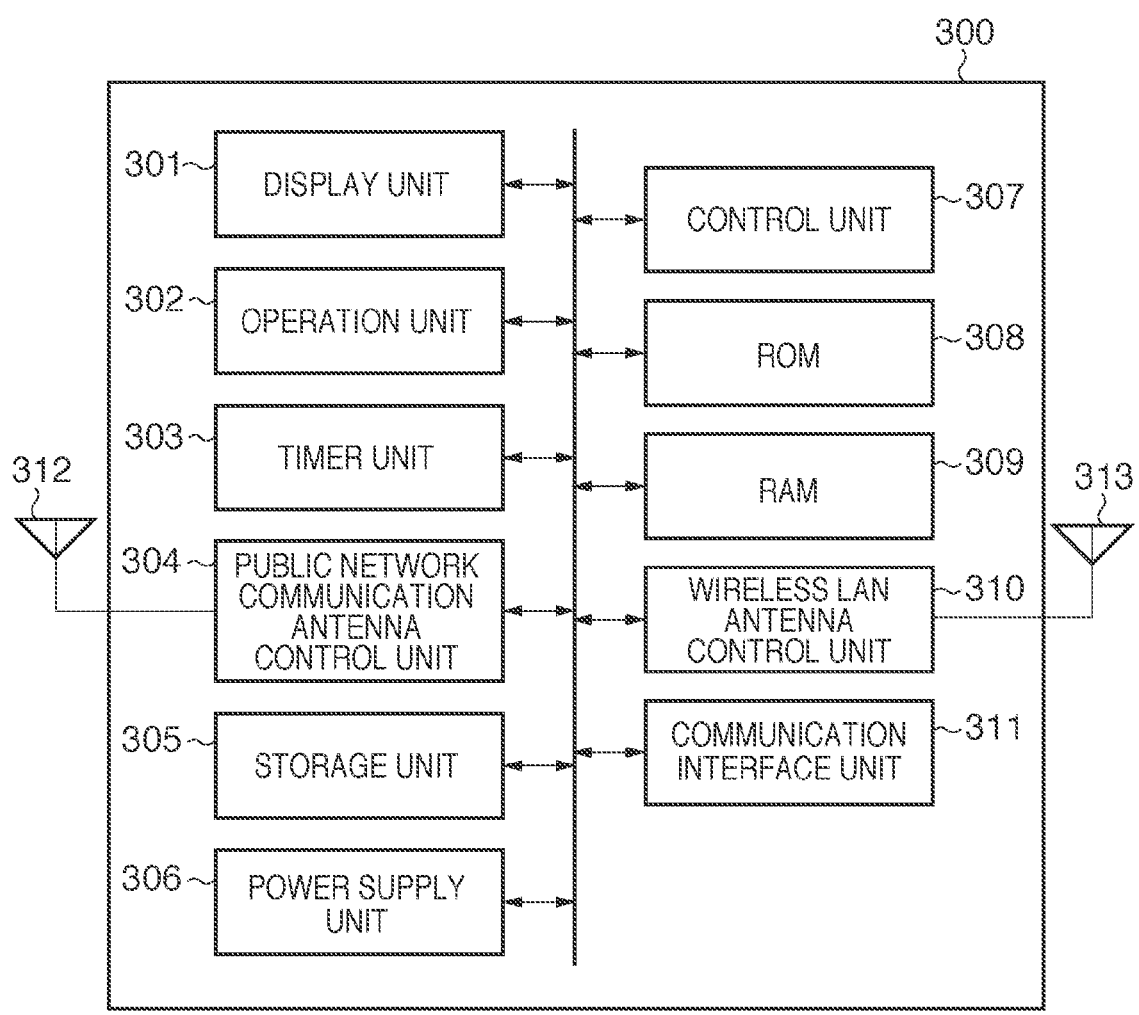
FIG. 3 is a block diagram showing an example of the hardware arrangement of a relay device according to the first and second embodiments.

The relay device according to this embodiment will be described in detail below with reference to the drawings. FIG. 3 is a block diagram showing the hardware arrangement of the relay device according to the embodiment of the present invention. FIG. 3 exemplifies the hardware arrangement of the mobile phone 300 as the relay device. A display unit 301 and operation unit 302 are used to, for example, display and execute an application. Whether or not the relay device is operated is determined by checking the presence/absence of an operation input from the operation unit 302. A storage unit 305 stores and manages various data such as wireless communication network information, data transmission/reception information, communication device information, and available service information.

A timer unit 303 measures a time. An antenna 312 is used to make a public network communication. A public network communication antenna control unit 304 controls the antenna 312. A power supply unit 306 supplies an electric power to the relay device.

A control unit 307 controls the mobile phone 300. A ROM 308 stores control commands, that is, programs. Reference numeral 309 denotes a RAM. An antenna 313 is used to make a wireless LAN communication. A wireless LAN antenna control unit 310 controls the antenna 313. A communication interface unit (to be referred to as communication IF hereinafter) 311 executes communication processing including network search, building, connection, and management processes. The communication IF 311 executes processes associated with both public network communications via the antenna 312 and wireless LAN communications via the antenna 313.

(Functional Configuration of Relay Device)

Figure 4:
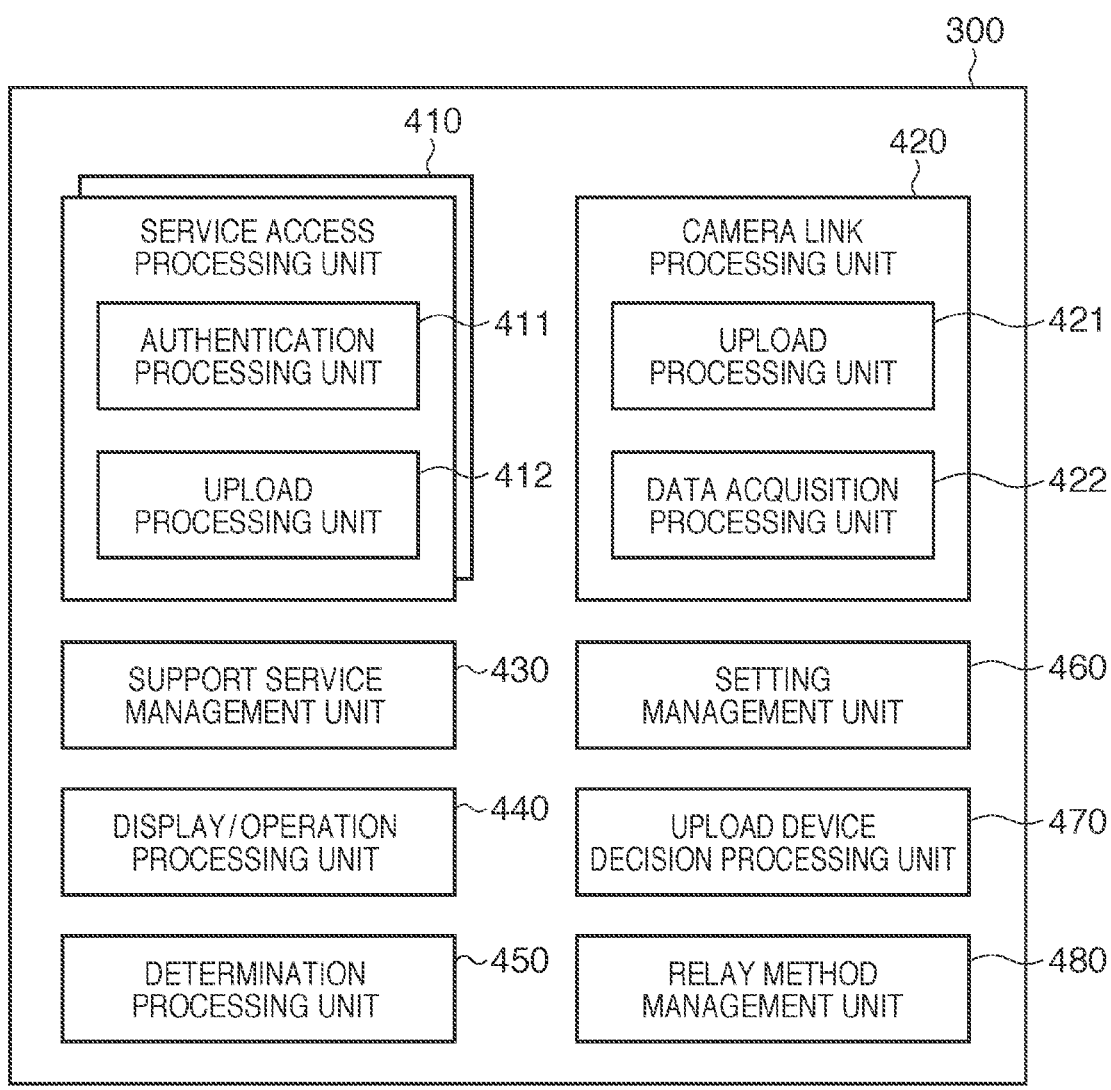
FIG. 4 is a block diagram showing an example of the functional configuration of the relay device according to the first and second embodiments.

The functional configuration of the relay device will be described below with reference to FIG. 4. In this embodiment, functional blocks of the relay device are stored in the ROM 308 as programs, which are executed by the control unit 307. Note that some or all of the functional blocks of the relay device may be implemented by hardware.

A service access processing unit 410 is a processing unit which incorporates communication protocols required to access a Web service. The service access processing unit 410 includes an authentication processing unit 411 and upload processing unit 412. The service access processing unit 410 is a processing unit which has functions equivalent to those of the service access processing unit 210 in the camera 100, and is prepared for each compatible Web service and each version of the Web service as in the camera 100.

A camera link processing unit 420 is a processing unit which exchanges messages with the camera to exchange data and to issue control requests. The camera link processing unit 420 includes an upload processing unit 421 and data acquisition processing unit 422. The upload processing unit 421 requests the service access processing unit 410 to upload an image to a Web service requested from the camera in response to a request from the camera. The upload processing unit 421 requests the camera to upload image data to the Web service. The data acquisition processing unit 422 acquires image data from the camera.

A support service management unit 430 manages types of Web services incorporated in the mobile phone 300 and their compatible versions.

A display/operation processing unit 440 incorporates a function of displaying, for example, images to be uploaded and Web service names as upload destinations to the user, and prompting the user to select them. A determination processing unit 450 determines whether a device which supports access protocols for the Web service selected by the display/operation processing unit 440 is the camera or mobile phone. A setting management unit 460 is a functional block which manages various settings associated with the operations of the mobile phone 300.

An upload device decision processing unit 470 decides upload protocols of an image to the Web service based on the determination result by the determination processing unit 450 and the setting information managed by the setting management unit 460. Then, the upload device decision processing unit 470 notifies the service access processing unit 410 and camera link processing unit 420 of the decision result. The upload device decision processing unit 470 determines whether a device which directly accesses the Web service is the camera or mobile phone. Then, the upload device decision processing unit 470 notifies a relay method management unit 480 of the IP router mode as an operation mode when the camera accesses the Web service or the Proxy mode when the mobile phone accesses the Web service. The upload device decision processing unit 470 notifies the camera link processing unit 420 so that the camera link processing unit 420 executes upload processing when the camera accesses the Web service. Also, the upload device decision processing unit 470 notifies the service access processing unit 410, so that the service access processing unit 410 executes upload processing when the mobile phone accesses the Web service.

The relay method management unit 480 manages the IP router mode and Proxy mode as relay operation modes. The relay method management unit 480 controls the communication IF 311 to execute data frame transfer processing (for example, transfer processing based on a bridge function that bridges each data frame of a TCP layer or higher) according to the mode.

The hardware arrangements and functional configurations of the communication device and relay device according to the embodiment of the present invention have been described. Note that the hardware arrangements and functional configurations are examples in the embodiment of the present invention. The present invention is not limited to the illustrated hardware arrangements and functional configurations, and any other hardware arrangements and functional configurations may be adopted as long as they can practice the present invention.

An embodiment as a characteristic feature of the present invention will be described below. FIG. 13A is a block diagram showing the device arrangement of a wireless communication system according to the first embodiment. The camera 100 is connected to the mobile phone 300, and the mobile phone 300 is connected to the Web server 1300. The mobile phone 300 has a function of relaying data communications between the camera 100 and Web server 1300 in the aforementioned IP router mode and Proxy mode. Also, the Web server 1300 has a Web service function (image storage function) available from the camera 100 and mobile phone 300.

FIG. 13B shows pieces of information (access information) of Web services which are managed by the support service management unit 230 of the camera 100, and are supported by the camera 100. With these pieces of access information, access functions held by the camera 100 can be specified. FIG. 13C shows pieces of information (access information) of Web services which are managed by the support service management unit 430 of the mobile phone 300, and are supported by the mobile phone 300. With these pieces of access information, access functions held by the mobile phone 300 can be specified.

(Operation Sequence of Camera 100)

Figure 5A:
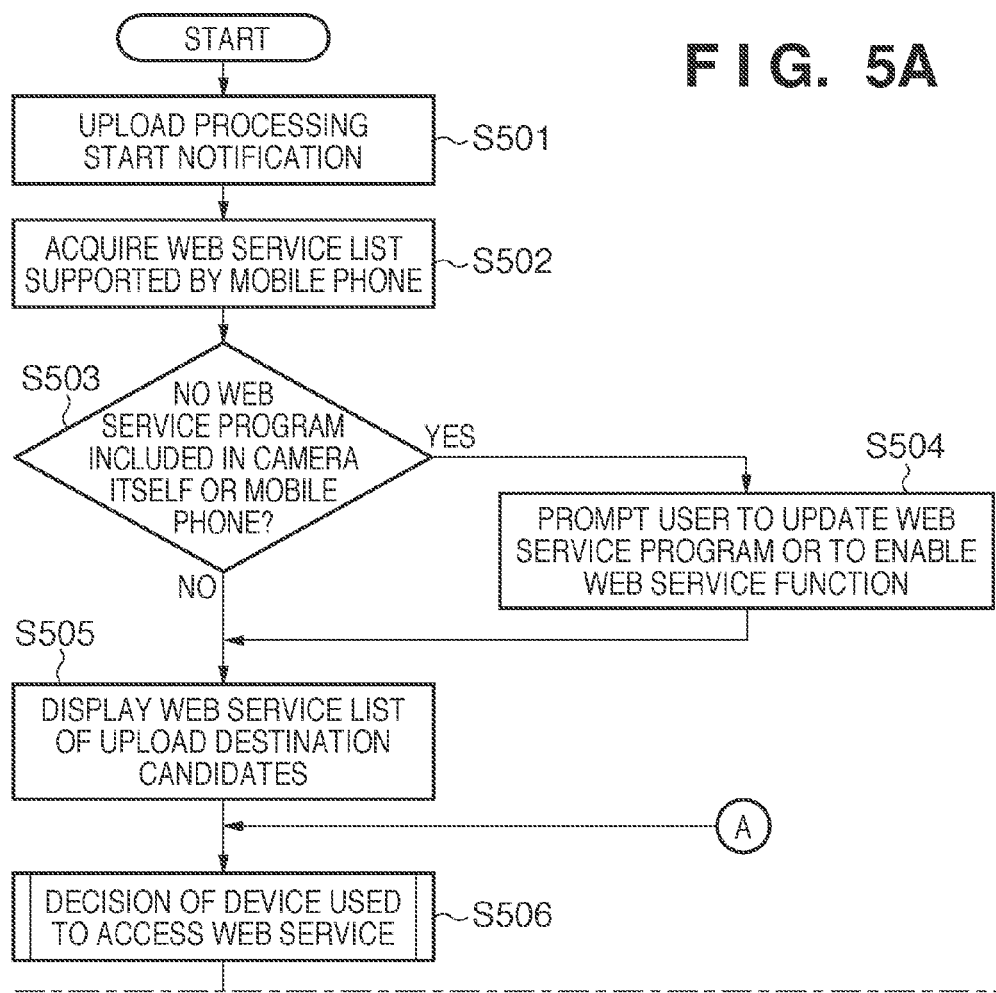
FIGS. 5A and 5B are flowcharts for explaining the operation sequence of the communication device according to the first embodiment.
Figure 5B:
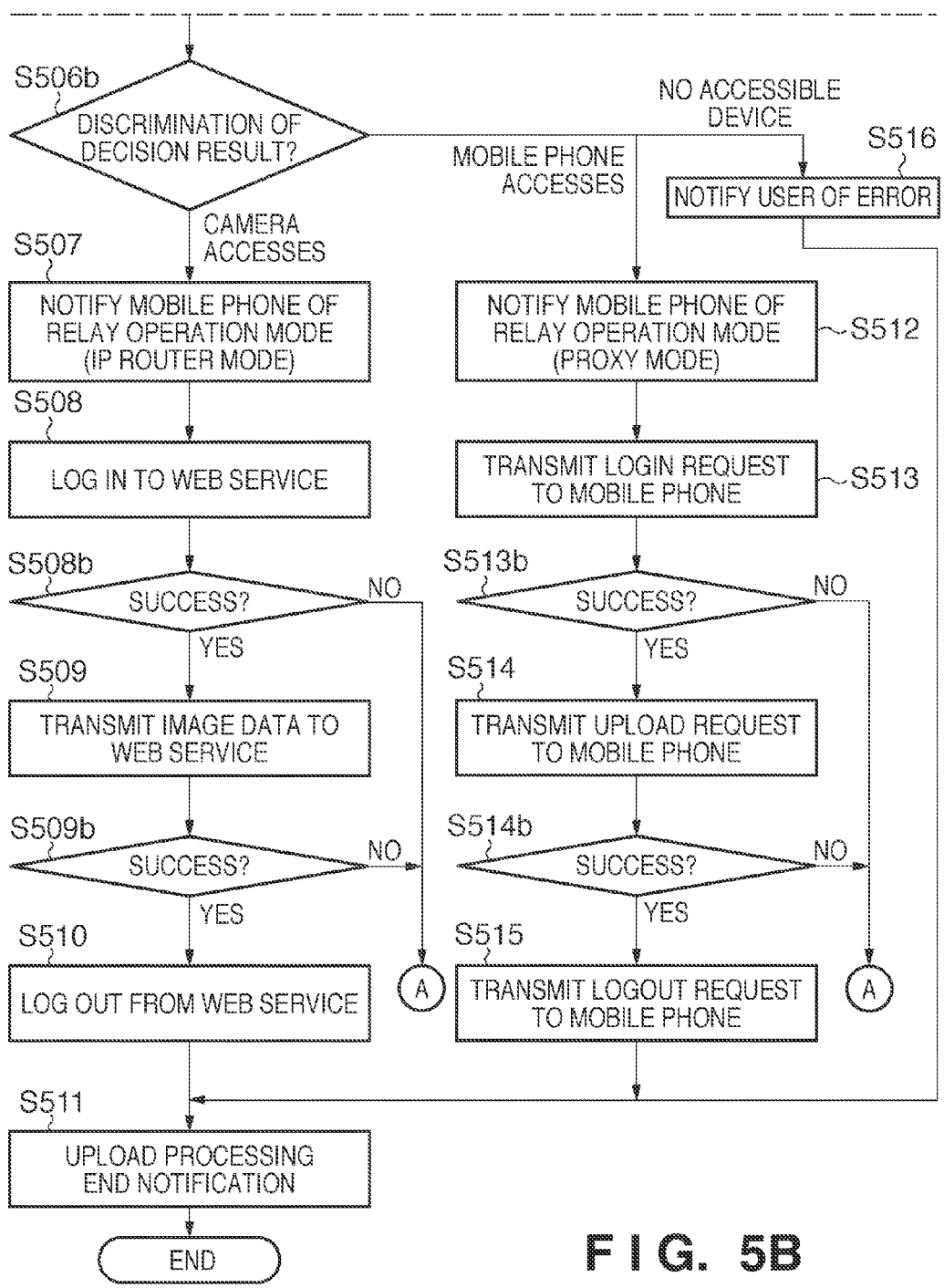

An example of the operation sequence of the camera 100 will be described below with reference to FIGS. 5A and 5B and FIGS. 6A and 6B. FIGS. 5A and 5B are flowcharts showing the operation sequence when image upload processing is executed in the camera 100. This processing is started when the user executes an operation required to start upload processing using the operation unit 102. The operation required to start the upload processing may be a button pressing operation or the upload processing may be started in cooperation with another operation such as a capturing operation. Assume that wireless LAN connection processing between the camera 100 and mobile phone 300 is complete prior to execution of this processing.

When the user executes the operation required to start the upload processing, the upload processing unit 221 transmits an upload processing start notification to the mobile phone 300 (S501).

Next, the support service management unit 230 acquires a list of Web services supported by the mobile phone 300, which list is returned as a response message from the mobile phone 300 (S502). The Web service list is that shown in FIG. 13C, and includes Web service names and pieces of version information of the compatible services. The support service management unit 230 determines whether the camera itself or mobile phone is compatible with an arbitrary Web service as a result of acquisition of the Web service list (S503). If the Web service list includes a Web service compatible with the camera 100 and mobile phone 300 (NO in S503), the process advances to step S505. If the Web service list does not include any Web service compatible with the camera 100 and mobile phone 300 (YES in S503), the support service management unit 230 prompts the user to update software so as to be compatible with a Web service program or to enable a Web service function (S504). In this case, the user may be informed of a message indicating that there is no available Web service, or the control may automatically transit to a Web service program setting mode. In this embodiment, the Web service list acquisition processing in step S502 is executed after the upload processing start notification in step S501. However, the Web service list acquisition processing may be executed first, and when no Web service information is available as a result of acquisition, the user may be informed of a message indicating that he or she cannot select the upload processing start itself or the upload processing is disabled by changing a display color.

After the Web service list is acquired, the display/operation processing unit 240 displays a list of Web services as upload destination candidates of the upload processing on the display unit 101 (S505). In this case, the display/operation processing unit 240 displays, as upload destination candidates, the Web service names acquired in step S502 and those (FIG. 13B), which are managed by the support service management unit 230 and are supported by the camera 100, at neighboring positions. That is, in this case, "AAA photo service", "BBB photo service", and "CCC photo service" are displayed. When the user selects an image to be uploaded and a Web service as an upload destination by operating the operation unit 102, the camera 100 decides a device used to access the Web service based on the selected Web service (S506). The processing in step S506 is executed by the determination processing unit 250 and upload device decision processing unit 270, and will be described in detail later with reference to FIGS. 6A and 6B.

In step S506b, the decision result in step S506 above is discriminated. As a result of discrimination of step S506, if it is decided that the camera 100 accesses the Web service ("camera accesses" in S506b), the process advances to step S507. The relay method management unit 222 transmits a notification message to the mobile phone 300 to operate relay processing in the IP router mode (S507). When the relay method management unit 222 receives a response message from the mobile phone 300, the authentication processing unit 211 executes login processing for the Web service (S508). Upon reception of a response message from the mobile phone 300, the authentication processing unit 211 establishes a connection to the Web server 1300 using HTTPS (Hypertext Transfer Protocol Security) (S508). The HTTPS connection is an encrypted communication which is made to assure secrecy for a communication between the camera 100 and Web server 1300, and is used in the login processing from the camera 100 to the Web service (S508). In order to log in to the Web service, the authentication processing unit 211 transmits a user name and password managed by itself to the Web service using HTTPS. In this case, since the secrecy of the communication is assured by the encrypted communication between the camera 100 and Web server 1300, the user name and password cannot be detected by the mobile phone 300. If the login processing to the Web service has succeeded (YES in S508b), the upload processing unit 212 transmits image data to the Web service (S509). Upon completion of the image upload processing (S509), the authentication processing unit 211 executes logout processing for the Web service (S510), and the upload processing unit 221 transmits an upload processing end notification to the mobile phone 300 (S511).

As a result of discrimination in step S506b, if it is decided that the mobile phone 300 accesses the Web service ("mobile phone accesses" in S506b), the process advances to step S512. The relay method management unit 222 transmits a notification message to the mobile phone 300 to operate the relay processing in the Proxy mode (S512). When the relay method management unit 222 receives a response message from the mobile phone 300, the upload processing unit 221 transmits a login request message for the Web service to the mobile phone 300 (S513). This login request message is transmitted while being appended with the Web service name selected by the user in step S505. The camera 100 checks based on a response message to the login request message whether or not the login processing in the mobile phone 300 has succeeded. If the login processing has succeeded (YES in S513b), the upload processing unit 221 transmits an upload request message to the mobile phone 300 (S514). The upload processing unit 221 transmits image data to be uploaded to the Web service while appending it to the upload request message. If the upload processing (S514) is complete (YES in S514b), the upload processing unit 221 transmits a logout request message to the mobile phone 300 (S515), and then transmits an upload processing end notification to the mobile phone 300 (S511).

If the login processing or upload processing has failed (NO in S508b, NO in S513b, NO in S509b, or NO in S514b), the process returns to step S506. The determination processing unit 250 and upload device decision processing unit 270 of the camera 100 execute the determination processing (S506) again. A case in which both the camera 100 and mobile phone 300 hold the access function to the Web service selected in step S505 corresponds to, for example, "CCC photo service" shown in FIGS. 13B and 13C. In this case, the camera 100 attempts to execute upload processing by changing a device used to access the Web service.

As a result of the determination processing in step S506b, if it is determined that there is no device that can access the Web service ("no accessible device" in S506b), the display/operation processing unit 240 displays an error message (S516). After that, the upload processing unit 221 transmits an upload processing end notification to the mobile phone 300 (S511).

(Detailed Operation of Step S506)

Figure 6A:
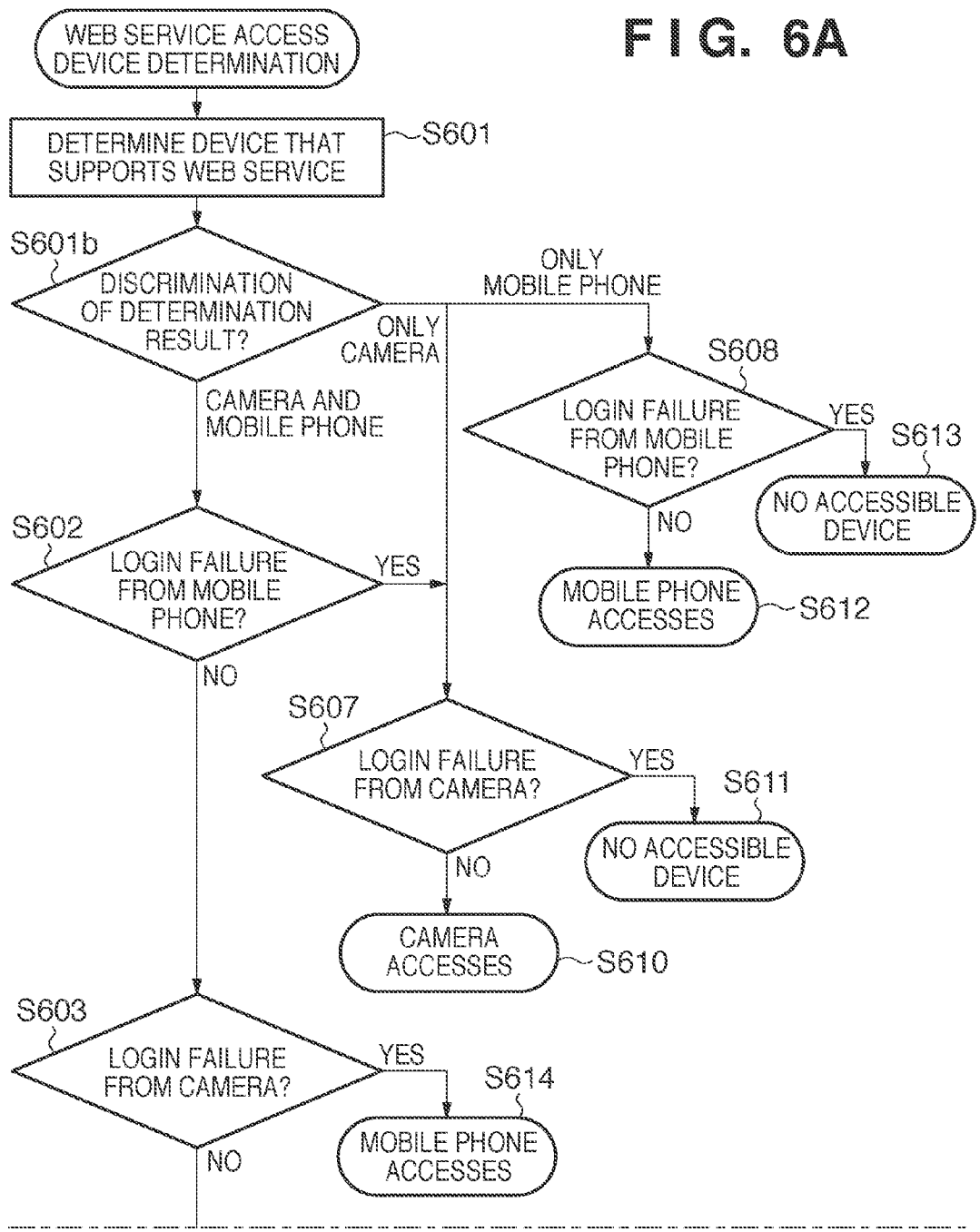
FIGS. 6A and 6B are flowcharts for explaining processing for determining a device used to access a Web service.
Figure 6B:
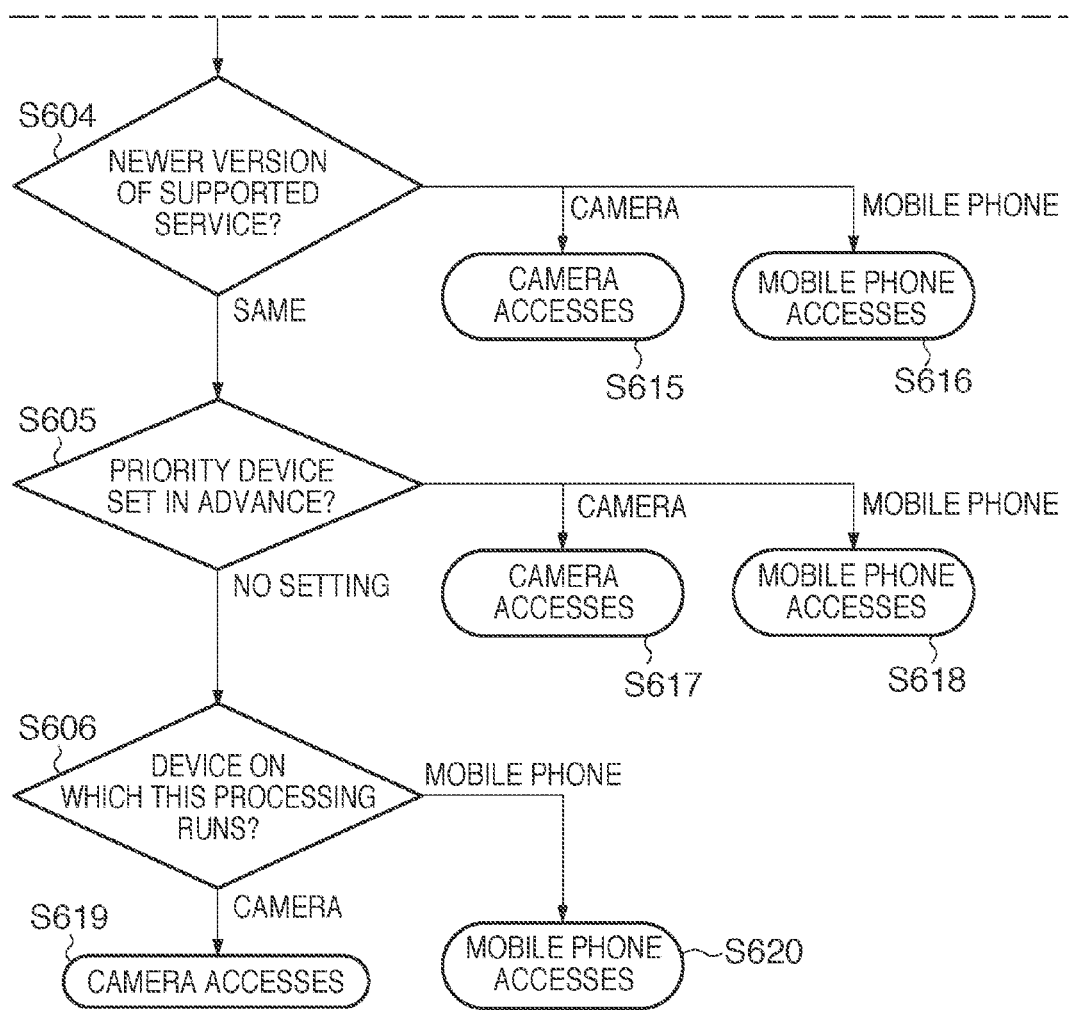

Detailed operations of step S506 will be described below with reference to FIGS. 6A and 6B. Upon deciding a device used to access the Web service, the determination processing unit 250 determines whether a device which supports the access function to the Web service as an upload destination is the camera 100 or mobile phone 300 (S601).

As a result of discrimination in step S601b, if the device which supports the access function to the Web service is only the camera 100 ("only camera" in S601b), the process advances to step S607. Then, the camera 100 is selected as the device used to access the Web service (NO in S607, S610). When this processing is called after the login processing by the camera 100 has failed, it is judged that there is no device which can access the Web service (YES in S607, S611).

If the device which supports the access function to the Web service is only the mobile phone 300 ("only mobile phone" in S601b), the process advances to step S608. The mobile phone 300 is selected as the device used to access the Web service (NO in S608, S612). When this processing is called after the login processing by the mobile phone 300 has failed, it is judged that there is no device which can access the Web service (YES in S608, S613).

If both the camera 100 and mobile phone 300 support the access function to the Web service ("camera and mobile phone" in S601b), the device used to access the Web service is decided by further checking several conditions (S602 to S606).

When this processing is called after the login processing by the mobile phone 300 has failed, the camera 100 is selected as the device used to access the Web service (YES in S602, NO in S607, S610). When this processing is called after the login processing by the camera 100 has failed, the mobile phone 300 is selected as the device used to access the Web service (YES in S603, S614). When this processing is called after both the login processing by the camera 100 and that by the mobile phone 300 have failed, it is judged that there is no device which can access the Web service (YES in S602, YES in S607, S611).

When the upload processing is executed for the first time (NO in S603), the process advances to step S604. In step S604, a device which has a newer version of the supported Web service is selected as the device used to access the Web service (S604). The camera 100 or mobile phone 300 is selected as the device used to access the Web service according to the comparison result of the versions of the Web service (S615, S616). If the camera 100 and mobile phone 300 support the same version of the Web service based on the comparison result ("same" in S604), when a priority device is set by the setting management unit 260, the set device is selected as the device used to access the Web service (S605). Assume that the setting to be referred to in this case is set by the user by operating the operation unit 102, but a priority order may be set in advance in, for example, the ROM 110. The camera 100 or mobile phone 300 is selected as the device used to access the Web service according to the priority device setting (S617, S618).

If there is no priority device setting in the setting management unit 260 ("no setting" in S605), the process advances to step S606, and the device on which this processing is running is selected as the device used to access the Web service (S606). In the first embodiment, the camera 100 is selected as the device used to access the Web service. In the second embodiment to be described later, the mobile phone 300 is selected as the device used to access the Web service.

(Operation Sequence of Mobile Phone 300)

Figure 7:
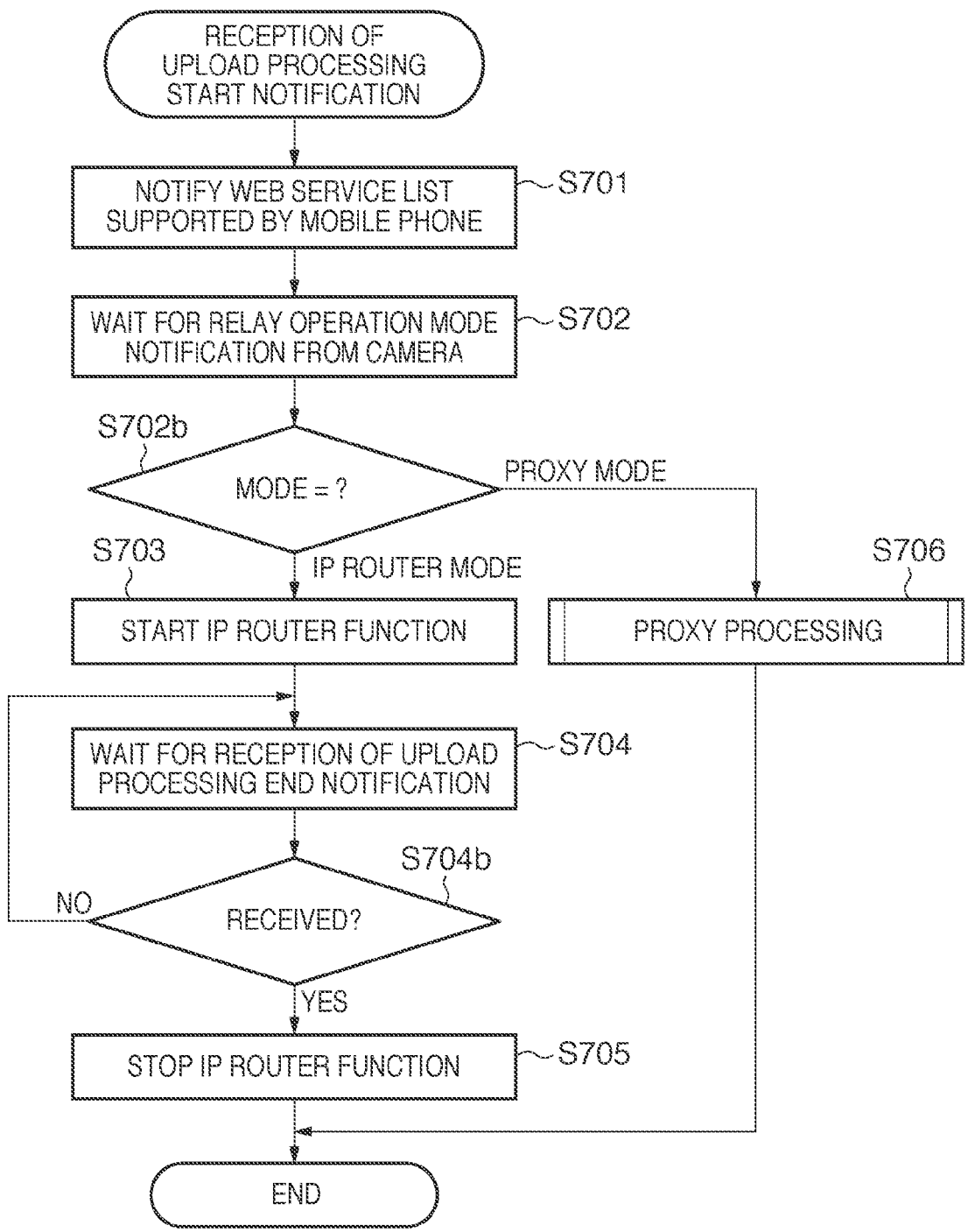
FIG. 7 is a flowchart for explaining the operation sequence of the relay device according to the first embodiment.
Figure 8:
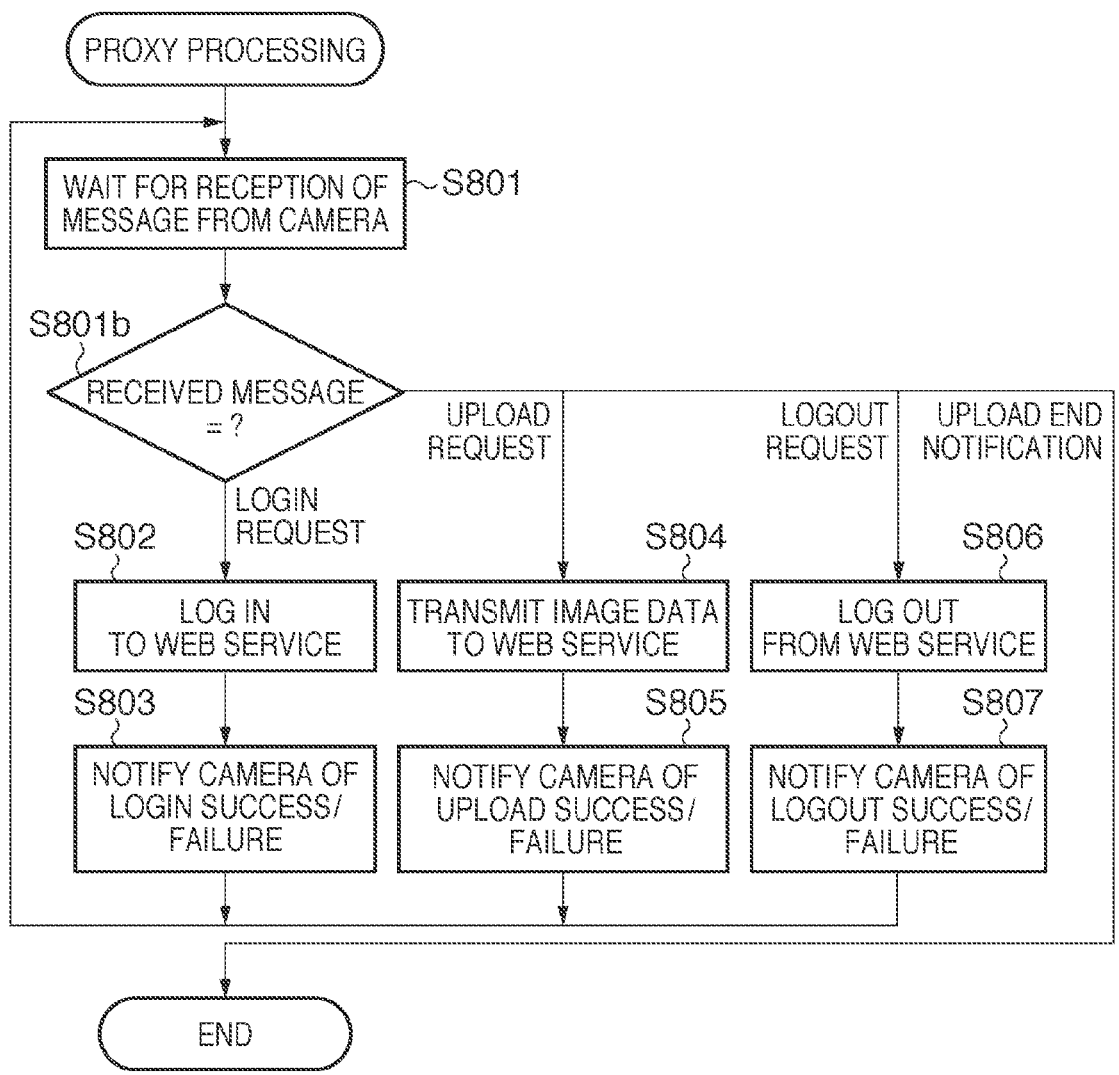
FIG. 8 is a flowchart for explaining the operation sequence of the relay device according to the first embodiment.

An example of the operation sequence of the mobile phone 300 will be described below with reference to FIGS. 7 and 8. FIG. 7 is a flowchart showing the operation sequence of the mobile phone 300 when the user executes upload processing using the camera 100. This processing is started when the upload processing unit 421 receives the upload processing start notification from the camera 100. Assume that the wireless LAN connection processing between the camera 100 and mobile phone 300 is complete prior to execution of this processing.

When the upload processing unit 421 receives the upload processing start notification from the camera 100, the support service management unit 430 transmits pieces of information of Web services supported by the mobile phone 300 to the camera 100 (S701). That is, the pieces of information of Web services to be transmitted in this step correspond to the list shown in FIG. 13C.

Upon completion of transmission of the Web service information, the upload processing unit 421 waits for a notification message which is transmitted from the camera 100 and designates the relay mode (S702). In step S702b, the relay mode designated in the notified message is determined.

If the relay operation in the IP router mode is instructed from the camera 100 ("IP router mode" in S702b), the process advances to step S703, and the relay method management unit 480 starts the relay operation in the IP router mode (S703). In this case, in this embodiment, assume that the operation shown in FIG. 14A is made as the IP router mode.

During the operation in the IP router mode, the mobile phone 300 serves as a gateway from the camera 100 with respect to the Internet (a network to which the Web server 1300 is connected). The mobile phone 300 terminates a part of an IP layer or lower of each packet which is transmitted from the camera 100 to the Internet, and allows a part of a TCP layer or higher to pass through itself. During the operation in the IP router mode, the upload processing unit 421 waits for an upload processing end notification from the camera 100 (S704). If the upload processing end notification is received (YES in S704b), the relay method management unit 480 stops the relay operation in the IP router mode (S705). Note that when the operation shown in FIG. 14B is made as the IP router mode, the same effects can be obtained.

On the other hand, if the relay operation in the Proxy mode is instructed from the camera 100 ("Proxy mode" in S702b), the process advances to step S706. The relay method management unit 480 starts the relay operation in the Proxy mode (S706). In this case, in this embodiment, assume that the operation shown in FIG. 14D is made as the Proxy mode.

(Detailed Operation of Step S706)

Detailed processing of step S706 will be described below with reference to FIG. 8. During the relay operation in the Proxy mode, the upload processing unit 421 waits for a message from the camera 100 (S801).

Upon reception of a login request message from the camera 100 ("login request" in S801b), the process advances to step S802. The authentication processing unit 411 executes login processing for the Web service as an upload destination received by the login request (S802). Upon completion of the login processing, the upload processing unit 421 notifies the camera 100 of the login processing result (success/failure) (S803).

Upon reception of an upload request message from the camera 100 ("upload request" in S801b), the process advances to step S804. The upload processing unit 421 uploads image data received by the upload request message to the Web service (S804). Upon completion of the upload processing to the Web service, the upload processing unit 421 notifies the camera 100 of the upload processing result (success/failure) (S805).

Upon reception of a logout request message from the camera 100 ("logout request" in S801b), the process advances to step S806. The authentication processing unit 411 executes logout processing for the Web service (S806). Upon completion of the logout processing for the Web service, the upload processing unit 421 notifies the camera 100 of the logout processing result (success/failure) (S807).

Upon reception of an upload end notification message from the camera 100 ("upload end notification" in S801b), the upload processing unit 421 ends the message waiting operation from the camera 100, thus ending the operation as the Proxy mode. Note that when the operation shown in FIG. 14C is made as the Proxy mode, the same effects can be obtained.

(Communication Sequence Among Devices)

An example of the communication sequence among the devices, that is, among the camera 100, mobile phone 300, and Web server 1300 (server apparatus) will be explained below with reference to FIGS. 11A to 11C. FIGS. 11A to 11C are charts showing an example of the communication sequence executed when the user uploads image data stored in the camera 100 to the Web service provided by the Web server 1300 via the mobile phone 300 by operating the camera 100.

Assume that a wireless LAN connection between the camera 100 and mobile phone 300 has already been established as an initial state. The user makes an operation required to start upload processing at the camera 100 (S1101). When the operation required to start the upload processing is made, the camera 100 transmits an upload processing start notification message to the mobile phone 300 (S1102). In response to this message, the mobile phone 300 transmits, to the camera 100, a response message including the list of pieces of information of Web services, which are supported by itself (S1103). Upon acquisition of the Web service information list, the camera 100 displays a list of Web services as upload destination candidates of the upload processing, and prompts the user to select a Web service (S1104). The upload destination candidates displayed in this case are obtained by combining the Web services acquired in step S1103 and those which are supported by the camera 100. When the user selects a Web service as an upload destination by operating the camera 100 (S1105), the camera 100 decides a device used to access the Web service (S1106). The processing in step S1106 is that shown in FIGS. 6A and 6B.

(When Camera 100 Accesses Web Service (FIG. 11B))

As a result of the processing in step S1106, when it is decided that the camera 100 accesses the Web service, the camera 100 transmits a notification message to the mobile phone 300 to execute relay processing in the IP router mode (S1107). In response to this message, the mobile phone 300 starts the relay processing in the IP router mode (S1108), and transmits a response message to the camera 100 (S1109).

Upon reception of the response message, the camera 100 logs in to the Web service (S1110). Then, the camera 100 uploads image data to the Web service (S1111) and logs out from the Web service (S1112). Upon completion of the logout processing from the Web service (S1112), the camera 100 transmits an upload processing end notification message to the mobile phone 300 (S1113). In response to this message, the mobile phone 300 stops the relay processing in the IP router mode (S1114), and transmits a response message to the camera 100 (S1115).

(When Mobile Phone 300 Accesses Web Service (FIG. 11C))

As a result of the processing in step S1106, when it is decided that the mobile phone 300 accesses the Web service, the camera 100 transmits a notification message to the mobile phone 300 to execute relay processing in the Proxy mode (S1116). In response to this message, the mobile phone 300 starts the relay processing in the Proxy mode (S1117, FIG. 8), and transmits a response message to the camera 100 (S1118). Upon reception of the response message, the camera 100 transmits a login request message to the mobile phone 300 (S1119). The camera 100 transmits this login request message appended with information associated with the Web service as the upload destination, which is selected by the user in step S1105. Upon reception of the login request message, the mobile phone 300 executes login processing for the Web service (S1120), and transmits the processing result to the camera 100 (S1121). Next, the camera 100 transmits an upload request message appended with image data to be uploaded to the mobile phone 300 (S1122). Upon reception of the upload request message, the mobile phone 300 acquires the image data appended to the message, uploads this image data to the Web service (S1123), and transmits the upload processing result to the camera 100 (S1124). Upon reception of a response message of the upload processing, the camera 100 transmits a logout request message to the mobile phone 300 (S1125). Upon reception of the logout request message, the mobile phone 300 executes logout processing for the Web service (S1126), and transmits the processing result to the camera 100 (S1127). Upon completion of the logout processing, the camera 100 transmits an upload processing end notification to the mobile phone 300 (S1128). Upon reception of the upload processing end notification, the mobile phone 300 stops the relay processing in the Proxy mode (S1129), and transmits a response message to the camera 100 (S1130).

Upon reception of a response message of the upload processing end notification (S1115, S1130), the camera 100 ends a series of image upload processes.

Second Embodiment

The first embodiment has described the embodiment in which the user operates a camera to upload image data to a Web service. The following second embodiment will explain an embodiment in which the user operates a mobile phone to upload image data in the camera to a Web service. As in the first embodiment, in the second embodiment, an IP router mode is that shown in FIG. 14A or 14B, and a Proxy mode is that shown in FIG. 14C or 14D.

In the second embodiment, the hardware arrangements and functional configurations are the same as the hardware arrangements (FIGS. 1 and 3) and functional configurations (FIGS. 2 and 4) of the first embodiment, and a description thereof will not be repeated. In the second embodiment, the arrangement of a wireless communication system and account information are the same as the arrangement of the wireless communication system (FIG. 13A) and access information (FIGS. 13B and 13C) of the first embodiment, and a description thereof will not be repeated.

(Operation Sequence of Mobile Phone 300)

Figure 9A:
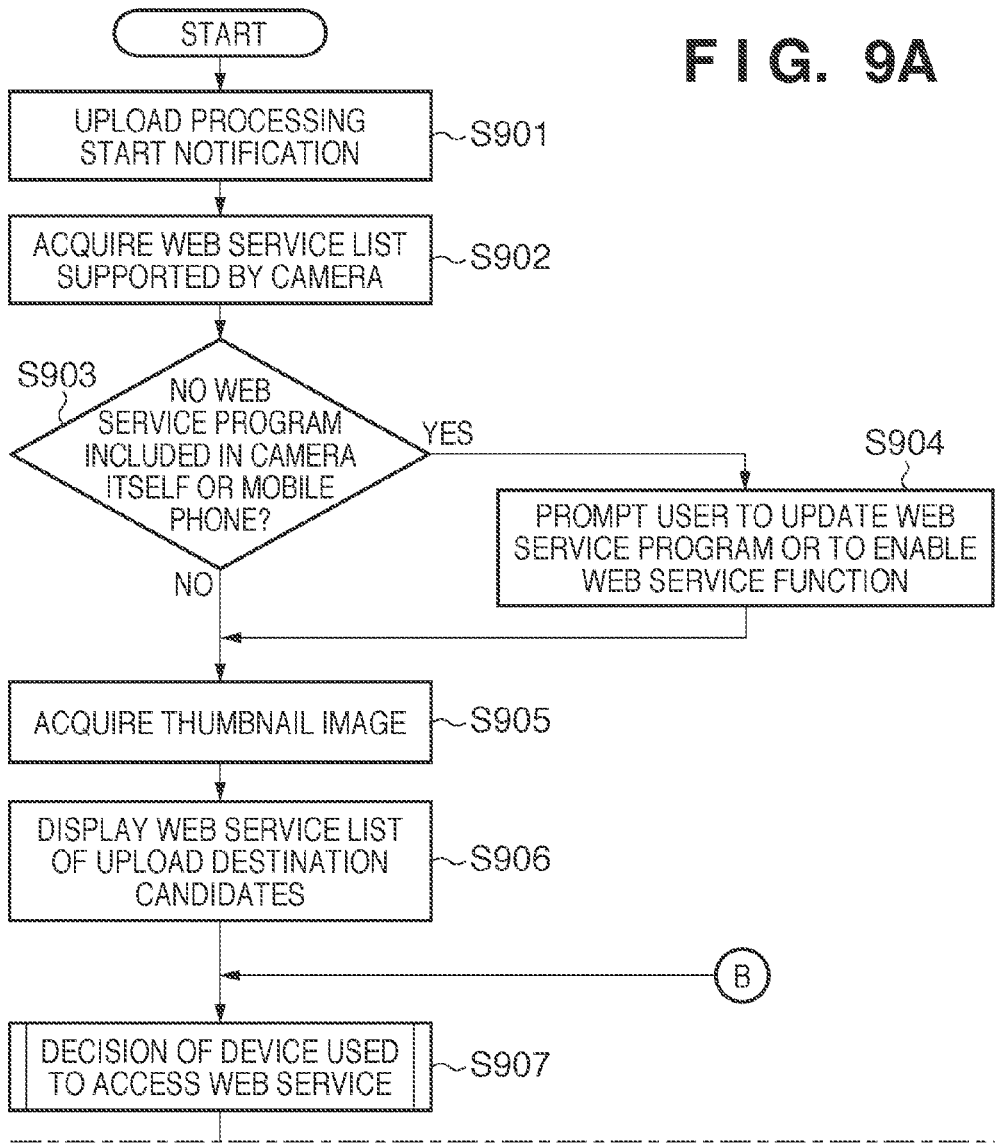
FIGS. 9A and 9B are flowcharts for explaining the operation sequence of the relay device according to the second embodiment.
Figure 9B:
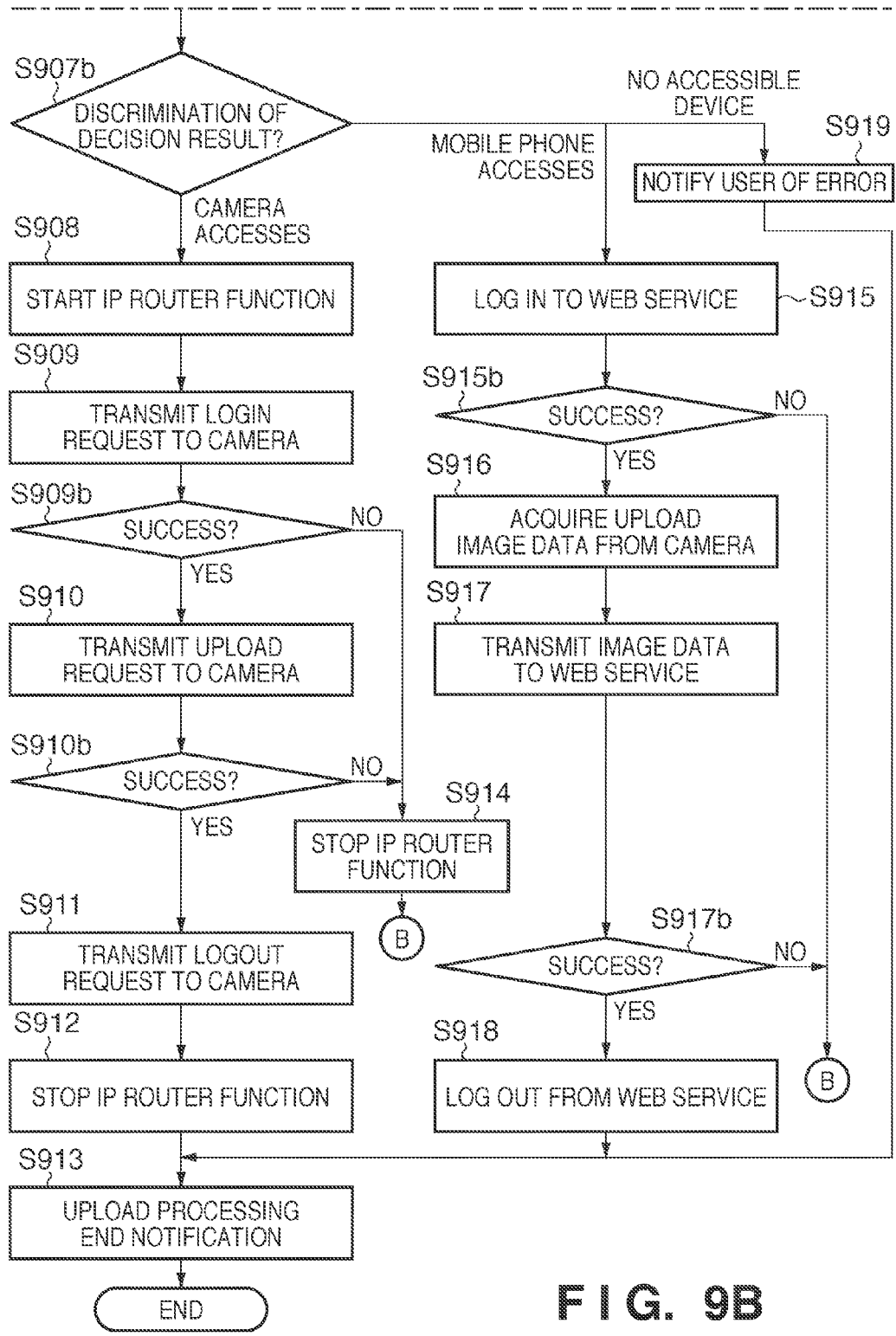

The operation sequence at the time of execution of image upload processing in a mobile phone 300 will be described below with reference to FIGS. 9A and 9B. This processing is started when the user makes an operation required to start upload processing using an operation unit 302. Assume that wireless LAN connection processing between a camera 100 and the mobile phone 300 is complete prior to execution of this processing.

When the operation required to start the upload processing is made, an upload processing unit 421 transmits an upload processing start notification to the camera 100 (S901). A support service management unit 430 acquires a list of Web services which are supported by the camera 100 as a response message returned from the camera 100 (S902). The Web service list is that shown in FIG. 13B, and includes Web service names and pieces of version information of the compatible services. As a result of acquisition of the Web service list, it is determined whether or not the camera or mobile phone has Web service programs, and is compatible with arbitrary Web services (S903). If the camera or mobile phone has Web service programs, the process advances to step S905. On the other hand, if it is determined in step S903 that the camera or mobile phone does not have any Web service program, the process advances to step S904. Then, the control prompts the user to update software to be compatible with a Web service program, or to enable a Web service function (S904). In this case, the user may be informed of a message indicating that there is no available Web service, or the control may automatically transit to a Web service program setting mode. In this embodiment, the Web service list acquisition processing in step S902 is executed after the upload processing start notification in step S901. However, the Web service list acquisition processing may be executed first, and when no Web service information is available as a result of acquisition, the user may be informed of a message indicating that he or she cannot select the upload processing start itself or the upload processing is disabled by changing a display color.

After the Web service list is acquired, a data acquisition processing unit 422 acquires a list of thumbnails of images to be uploaded from the camera 100 (S905).

A display/operation processing unit 440 displays a list of Web services as upload destination candidates of the upload processing and a list of the thumbnail images acquired in step S905 on a display unit 301 (S906). In this case, the display/operation processing unit 440 displays, as upload destination candidates, the Web service names acquired in step S902 and those (FIG. 13C), which are managed by the support service management unit 430 and are supported by the mobile phone 300, at neighboring positions. That is, in this case, "AAA photo service", "BBB photo service", and "CCC photo service" are displayed.

When the user selects an image to be uploaded and a Web service name (Web service information) by operating the operation unit 302, the mobile phone 300 decides a device used to access the Web service based on the selected Web service information (S907). The processing in step S907 is the same as that shown in FIGS. 6A and 6B described in the first embodiment, and a description thereof will not be repeated.

In step S907b, the decision result in step S907 above is discriminated. As a result of determination in step S907, if it is decided that the camera 100 accesses the Web service ("camera accesses" in S907b), the process advances to step S908. A relay method management unit 480 starts relay processing in the IP router mode (S908). Assume that in this embodiment, the operation shown in FIG. 14A is made as the IP router mode.

During the operation in the IP router mode, the mobile phone 300 serves as a gateway from the camera 100 with respect to the Internet (a network to which a Web server 1300 is connected). The mobile phone 300 terminates a part of an IP layer or lower of each packet which is transmitted from the camera 100 to the Internet, and allows a part of a TCP layer or higher to pass through itself.

When a communication in the IP router mode is started, the upload processing unit 421 transmits a login request message for the Web service to the camera 100 (S909). The upload processing unit 421 transmits this login request message appended with the Web service name, which is selected by the user in step S906. Upon reception of this login request, the camera 100 executes login processing (to be described later) for the Web service. However, the mobile phone 300 merely transfers (passes through) data for a part of the TCP layer or higher of each data frame exchanged between the camera 100 and Web server 1300, and does not detect any data contents. The mobile phone 300 judges based on a response message to the login request message whether the login processing in the camera 100 has succeeded or failed.

If the login processing has succeeded (YES in S909b), the upload processing unit 421 transmits an upload request message to the camera 100 (S910). The upload processing unit 421 transmits the upload request message appended with an identifier of an image, which is selected by the user in step S906, and is to be uploaded to the Web service. Upon completion of the upload processing (S910), the upload processing unit 421 transmits a logout request message to the camera 100 (S911). After that, the relay method management unit 480 stops the IP router function (S912), and the upload processing unit 421 transmits an upload processing end notification to the camera 100 (S913).

On the other hand, if the login processing has failed (NO in S909b), or if the upload processing has failed (NO in S910b), the relay method management unit 480 stops the IP router function (S914). Then, a determination processing unit 450 and upload device decision processing unit 470 execute the determination processing in step S907 again. A case in which the mobile phone 300 also holds the access function to the Web service selected in step S906 corresponds to, for example, "CCC photo service" shown in FIGS. 13B and 13C. In this case, the mobile phone 300 attempts to execute upload processing by changing a device used to access the Web service.

As a result of discrimination in step S907, if it is decided that the mobile phone 300 accesses the Web service ("mobile phone accesses" in S907b), the process advances to step S915. An authentication processing unit 411 executes login processing for the Web service (S915). When the login processing for the Web service has succeeded (YES in S915b), the data acquisition processing unit 422 transmits an upload image request message to the camera 100, and acquires actual image data of an image to be uploaded to the Web service from the camera 100 (S916). Upon completion of acquisition of the actual image data, an upload processing unit 412 transmits the image data to the Web service (S917). Upon completion of the image upload processing (S917), the authentication processing unit 411 executes logout processing for the Web service (S918), and the upload processing unit 421 transmits an upload processing end notification to the camera 100 (S913).

If the login processing has failed (NO in S915b), or if the upload processing has failed (NO in S917b), the determination processing unit 450 and upload device decision processing unit 470 execute the determination processing in step S907 again. When the camera 100 also supports the access protocol to the Web service selected in step S906, the mobile phone 300 attempts to execute login processing by changing the device used to access the Web service to the camera 100.

On the other hand, as a result of the determination processing in step S907, if it is determined that there is no device which can access the Web service ("no accessible device" in S907b), the process advances to step S919. The display/operation processing unit 440 displays an error message (S919). After that, the upload processing unit 421 transmits an upload processing end notification to the camera 100 (S913).

(Operation Sequence of Camera 100)

The operation sequence of the camera 100 when the user executes the upload processing using the mobile phone 300 will be described below with reference to FIG. 10. This processing is started when an upload processing unit 221 receives an upload processing start notification from the mobile phone 300. Assume that wireless LAN connection processing between the camera 100 and mobile phone 300 is complete prior to execution of this processing.

When the upload processing unit 221 receives the upload processing start notification from the mobile phone 300, a support service management unit 230 transmits pieces of information of Web services supported by the camera 100 to the mobile phone 300 (S1001). That is, the pieces of Web service information to be transmitted in this step correspond to the list shown in FIG. 13B. Upon completion of transmission of the Web service information, the upload processing unit 221 waits for a notification message transmitted from the mobile phone 300 (S1002).

Upon reception of a login request message from the mobile phone 300 ("login request" in S1002b), the process advances to step S1003. An authentication processing unit 211 establishes a connection with the Web server 1300 using HTTPS (S1003). Next, the authentication processing unit 211 executes login processing for a Web service as an upload destination received by the login request (S1003). Upon completion of the login processing, the upload processing unit 221 notifies the mobile phone 300 of the login processing result (success/failure) (S1004).

Upon reception of an upload request message from the mobile phone 300 ("upload request" in S1002b), the process advances to step S1005. An upload processing unit 212 uploads data of an image indicated by an image identifier received by the upload request message to the Web service (S1005). Upon completion of the upload processing to the Web service, the upload processing unit 221 notifies the mobile phone 300 of the upload processing result (success/failure) (S1006).

Upon reception of a logout request message from the mobile phone 300 ("logout request" in S1002b), the process advances to step S1007, and the authentication processing unit 211 executes logout processing for the Web service (S1007). Upon completion of the logout processing for the Web service, the upload processing unit 221 notifies the mobile phone 300 of the logout processing result (success/failure) (S1008).

Upon reception of an upload image request message from the mobile phone 300 ("upload image request" in S1002b), the process advances to step S1009. The upload processing unit 221 transmits image data designated by the upload image request message to the mobile phone 300 (S1009). The upload image request message designates a type (actual image or thumbnail) of image data, and an identifier (file name, all images, etc.) of an image to be acquired, and the upload processing unit 221 transmits data corresponding to this to the mobile phone 300.

Upon reception of an upload end notification message from the mobile phone 300 ("upload end notification" in S1002b), the upload processing unit 221 ends the message waiting operation from the mobile phone 300.

(Communication Sequence Among Devices)

An example of the communication sequence among the devices, that is, among the camera 100, mobile phone 300, and Web server 1300 will be explained below with reference to FIGS. 12A to 12C. FIGS. 12A to 12C are charts showing an example of the communication sequence executed when the user uploads image data stored in the camera 100 to the Web service provided by the Web server 1300 via the mobile phone 300 by operating the mobile phone 300.

Assume that a wireless LAN connection between the camera 100 and mobile phone 300 has already been established as an initial state. The user makes an operation required to start upload processing at the mobile phone 300 (S1201). When the operation required to start the upload processing is made, the mobile phone 300 transmits an upload processing start notification message to the camera 100 (S1202). In response to this message, the camera 100 transmits, to the mobile phone 300, a response message including a list of pieces of information of Web services, which are supported by itself (S1203). Subsequently, the mobile phone 300 transmits an upload image request message to the camera 100, and requests the camera 100 to transmit thumbnail data of images held by the camera 100 (S1204). The camera 100 transmits a list of thumbnail data of images held by itself and identifiers of the images to the mobile phone 300 (S1205). Upon acquisition of the Web service information and thumbnail data list, the mobile phone 300 displays a list of the acquired thumbnail images and Web services as upload destination candidates of upload processing, and prompts the user to select them (S1206). The upload destination candidates displayed in this case are obtained by combining the Web services acquired in step S1203 and Web services, access functions of which are supported by the mobile phone 300. When the user selects an image to be uploaded and a Web service as an upload destination by operating the mobile phone 300 (S1207), the mobile phone 300 decides a device used to access the Web service (S1208). The processing in step S1208 is that shown in FIGS. 6A and 6B.

(When Camera 100 Accesses Web Service (FIG. 12B))

As a result of the processing in step S1208, when it is decided that the camera 100 accesses the Web service, the mobile phone 300 starts relay processing in the IP router mode (S1209). Subsequently, the mobile phone 300 transmits a login request message to the camera 100 (S1210). The mobile phone 300 transmits this login request message appended with information associated with the Web service, which is selected by the user in step S1207. Upon reception of the login request message, the camera 100 executes login processing for the Web service (S1211), and transmits the processing result to the mobile phone 300 (S1212). Next, the mobile phone 300 transmits an upload request message which designates an identifier of an image to be uploaded to the camera 100 (S1213). Upon reception of the upload request message, the camera 100 uploads actual image data of the image designated by the message to the Web service (S1214), and transmits the upload processing result to the mobile phone 300 (S1215). Upon reception of a response message of the upload processing, the mobile phone 300 transmits a logout request message to the camera 100 (S1216). Upon reception of the logout request message, the camera 100 executes logout processing for the Web service (S1217), and transmits the processing result to the mobile phone 300 (S1218). Upon reception of a response message to the logout request, the mobile phone 300 stops the relay processing in the IP router mode (S1219), and transmits an upload processing end notification to the camera 100 (S1220). The camera 100 returns a response message to the upload processing end notification to the mobile phone 300 (S1221). Note that when the operation shown in FIG. 14B is made as the IP router mode, the same effects can be obtained.

(When Mobile Phone 300 Accesses Web Service (FIG. 12C))

As a result of the processing in step S1208, when it is decided that the mobile phone 300 accesses the Web service, the mobile phone 300 executes login processing for the Web service (S1222). When the login processing has succeeded, the mobile phone 300 transmits an upload image request message to the camera 100, and requests the camera 100 to transmit actual image data of the image selected in step S1207 (S1223). The camera 100 transmits actual image data of the image designated by the upload image request message to the mobile phone 300 (S1224). In response to this, the mobile phone 300 uploads the received image data to the Web service (S1225), and executes logout processing (S1226) after completion of the upload processing. Upon completion of the logout processing, the mobile phone 300 transmits an upload processing end notification to the camera 100 (S1227), and the camera 100 transmits a response message to that notification to the mobile phone 300 (S1228).

(Modifications)

The components described in the aforementioned first and second embodiments are presented for the exemplary purpose only, and the technical scope of the present invention is settled by the scope of the appended claims, but is not limited by each individual embodiment. For example, in the first and second embodiments, as a means for allowing each frame data to pass through the mobile phone, the operation of an IP router which terminates an IP layer has been exemplified. However, the gist of the present invention is not limited to this. Each frame data associated with upload processing, which is exchanged between the camera and Web service, need only be passed through the mobile phone. More specifically, each frame need only be passed through the mobile phone while the mobile phone is not allowed to analyze confidential information included in that frame data associated with the authentication processing. Hence, such processing may be implemented using, for example, a technique such as SOCKS proxy. Alternatively, this processing may be implemented using NAT (Network Address Translation), which replaces a local IP address used in a communication between the camera and mobile phone by a global IP address used in a communication between the mobile phone and Web server. Furthermore, an operation may be made to pass through each frame of an IP layer or higher (to terminate a part of a MAC layer or lower).

In the first and second embodiments, all of the login processing, upload processing, and logout processing for the Web service are executed by either the camera or mobile phone. However, the gist of the present invention is not limited to this. For example, the scope of the present invention also includes an embodiment in which the login processing and logout processing are executed by the camera, and the upload processing is executed by the mobile phone.

In the first and second embodiments, the camera and mobile phone are connected via the wireless LAN. However, the gist of the present invention is not limited to this. For example, the camera and mobile phone may be connected via a wireless communication such as Bluetooth® or an infrared communication or a wired communication such as a wired LAN or USB.

In the first and second embodiments, the mobile phone and Web server are connected via a public communication network and the Internet. However, the gist of the present invention is not limited to this. For example, the scope of the present invention also includes a connection mode in which the mobile phone establishes a connection to an access point using a wireless LAN communication, and is connected to the Web server via a local network to which the access point belongs.

In the first and second embodiments, the relay processing mode in the mobile phone is designated by a message from the camera. However, the gist of the present invention is not limited to this. For example, the mobile phone may always operate in the Proxy mode, and the camera may notify the mobile phone only when the mobile phone is to operate in the IP router mode.

According to the embodiments of the present invention or their modifications, in a system which transmits an image in a communication apparatus to a Web service via a relay apparatus, the user can transmit an image without considering an apparatus which supports an access function to the Web service. That is, an apparatus and a wireless communication system which allow the user to upload an image by operating one of the communication apparatus and relay apparatus can be provided.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-171176, filed Jul. 29, 2010, which is hereby incorporated by reference herein in its entirety.

What is claimed is:

1. A communication apparatus, which is connected to a relay apparatus, and transmits data to a server apparatus connected via the relay apparatus, said apparatus comprising:
    a determination unit adapted to determine whether said communication apparatus or the relay apparatus holds an access function required to execute access processing to the server apparatus;
    a decision unit adapted to decide, according to a determination result of said determination unit, a transmission method required to transmit the data by controlling an access processing unit of the apparatus that holds the access function to execute the access processing; and
    a transmission unit adapted to transmit the data by the transmission method decided by said decision unit.

2. The apparatus according to claim 1, wherein when said determination unit determines that said communication apparatus holds the access function,
    an access processing unit of said communication apparatus executes the access processing to the server apparatus via a communication based on the access function.

3. The apparatus according to claim 2, wherein when said determination unit determines that said communication apparatus holds the access function,
   said decision unit decides a transmission method required to transmit, to the server apparatus, access information, which is used in a communication based on the access function, without being detected by the relay apparatus.

4. The apparatus according to claim 1, wherein when said determination unit determines that the relay apparatus holds the access function,
   said decision unit controls an access processing unit of the relay apparatus to execute a communication based on the access function.

5. The apparatus according to claim 4, wherein said decision unit decides one of a bridge function which bridges a data frame of not lower than a TCP layer, NAT (Network Address Translation), and SOCKS proxy as the transmission method which is configured to be executed by the access processing unit of the relay apparatus.

6. The apparatus according to claim 1, wherein when said determination unit determines that said communication apparatus and the relay apparatus hold the access function,
   said decision unit compares a version of access information required to specify the access function held by said communication apparatus with a version of access information used in a communication based on the access function held by the relay apparatus, and controls an access processing unit of the apparatus which holds the access information of the newer version to execute access processing to the server apparatus.

7. The apparatus according to claim 1, wherein when said determination unit determines that said communication apparatus and the relay apparatus hold the access function,
   said decision unit determines based on the presence/absence of an operation input from an operation unit required to operate said communication apparatus and the presence/absence of an operation input from an operation unit required to operate the relay apparatus whether an apparatus operated by a user is said communication apparatus or the relay apparatus, and controls an access processing unit of the apparatus operated by the user to execute access processing to the server apparatus according to the determination result.

8. The apparatus according to claim 1, wherein when said determination unit determines that said communication apparatus and the relay apparatus hold the access function,
   said decision unit controls an access processing unit of the apparatus specified by a priority order which is set in advance to execute access processing to the server apparatus.

9. The apparatus according to claim 1, wherein when said determination unit determines that said communication apparatus and the relay apparatus hold the access function, and determines that the access processing unit of said communication apparatus has failed the access processing,
   said decision unit controls an access processing unit of the relay apparatus, which does not execute the access processing, to execute the access processing.

10. The apparatus according to claim 1, further comprising:
    a display unit adapted to display the access functions held by at least one of said communication apparatus and the relay apparatus; and
    a selection unit adapted to select one of the access functions displayed by said display unit as an access function used upon transmission of data to the server apparatus.

11. A relay apparatus, which is connected to a communication apparatus and a server apparatus, and relays transmission of data from the communication apparatus to the server apparatus, said apparatus comprising:
    a determination unit adapted to determine whether the communication apparatus or said relay apparatus holds an access function required to execute access processing to the server apparatus;
    a decision unit adapted to decide, according to a determination result of said determination unit, a transmission method required to transmit the data by controlling an access processing unit of the apparatus that holds the access function to execute the access processing; and
    a transmission unit adapted to transmit the data by the transmission method decided by said decision unit.

12. The apparatus according to claim 11, wherein when said determination unit determines that the communication apparatus holds the access function,
    an access processing unit of the communication apparatus executes the access processing to the server apparatus via a communication based on the access function.

13. The apparatus according to claim 12, wherein when said determination unit determines that the communication apparatus holds the access function,
    said decision unit decides a transmission method required to transmit, to the server apparatus, access information, which is used in a communication based on the access function, without being detected by said relay apparatus.

14. The apparatus according to claim 11, wherein when said determination unit determines that said relay apparatus holds the access function,
    an access processing unit of said relay apparatus executes the access processing to the server apparatus via a communication based on the access function.

15. The apparatus according to claim 14, wherein said decision unit decides one of a bridge function which bridges a data frame of not lower than a TCP layer, NAT (Network Address Translation), and SOCKS proxy as the transmission method which is configured to be executed by the access processing unit of said relay apparatus.

16. The apparatus according to claim 11, wherein when said determination unit determines that the communication apparatus and said relay apparatus hold the access function,
    said decision unit compares a version of access information required to specify the access function held by the communication apparatus with a version of access information used in a communication based on the access function held by said relay apparatus, and controls an access processing unit of the apparatus which holds the access information of the newer version to execute access processing to the server apparatus.

17. The apparatus according to claim 11, wherein when said determination unit determines that the communication apparatus and said relay apparatus hold the access function,
    said decision unit determines based on the presence/absence of an operation input from an operation unit required to operate the communication apparatus and the presence/absence of an operation input from an operation unit required to operate said relay apparatus whether an apparatus operated by a user is the communication apparatus or said relay apparatus, and controls an access processing unit of the apparatus operated by the user to execute access processing to the server apparatus according to the determination result.

18. The apparatus according to claim 11, wherein when said determination unit determines that the communication apparatus and said relay apparatus hold the access function, said decision unit controls an access processing unit of the apparatus specified by a priority order which is set in advance to execute access processing to the server apparatus.

19. The apparatus according to claim 11, wherein when said determination unit determines that the communication apparatus and said relay apparatus hold the access function, and determines that the access processing unit of said relay apparatus has failed the access processing, said decision unit controls an access processing unit of the communication apparatus, which does not execute the access processing, to execute the access processing.

20. The apparatus according to claim 11, further comprising:

a display unit adapted to display the access functions held by at least one of the communication apparatus and said relay apparatus; and a selection unit adapted to select one of the access functions displayed by said display unit as an access function used upon transmission of data to the server apparatus.

21. A wireless communication system in which a communication apparatus is connected to a relay apparatus, and transmits data to a server apparatus connected via said relay apparatus, said communication apparatus and said relay apparatus comprising:

a determination unit adapted to determine whether said communication apparatus or said relay apparatus holds an access function required to execute access processing to the server apparatus;

a decision unit adapted to decide, according to a determination result of said determination unit, a transmission method required to transmit the data by controlling an access processing unit of the apparatus that holds the access function to execute the access processing; and a transmission unit adapted to transmit the data by the transmission method decided by said decision unit.

22. A control method of a communication apparatus, which is connected to a relay apparatus, and transmits data to a server apparatus connected via the relay apparatus, the method comprising:

a determination step of determining whether the communication apparatus or the relay apparatus holds an access function required to execute access processing to the server apparatus;

a decision step of deciding, according to a determination result in the determination step, a transmission method required to transmit the data by controlling an access processing unit of the apparatus that holds the access function to execute the access processing; and a transmission step of transmitting the data by the transmission method decided in the decision step.

23. A control method of a relay apparatus, which is connected to a communication apparatus and a server apparatus, and relays transmission of data from the communication apparatus to the server apparatus, the method comprising:

a determination step of determining whether the communication apparatus or the relay apparatus holds an access function required to execute access processing to the server apparatus;

a decision step of deciding, according to a determination result in the determination step, a transmission method required to transmit the data by controlling an access processing unit of the apparatus that holds the access function to execute the access processing; and a transmission step of transmitting the data by the transmission method decided in the decision step.

24. A storage medium storing a program for controlling a computer to execute a control method of a communication apparatus according to claim 22.

25. A storage medium storing a program for controlling a computer to execute a control method of a relay apparatus according to claim 23.

* * * * *